(12) United States Patent
Robe et al.

(10) Patent No.: US 12,126,525 B2
(45) Date of Patent: Oct. 22, 2024

(54) REDUNDANCY MATRIX-BASED SYSTEM

(71) Applicant: THALES, Courbevoie (FR)

(72) Inventors: Thomas Robe, Toulouse (FR); Thierry Adam, Toulouse (FR); Olivier Vendier, Toulouse (FR); Benjamin Therond, Toulouse (FR)

(73) Assignee: THALES, Courbevoie (FR)

( * ) Notice: Subject to any disclaimer, the term of this patent is extended or adjusted under 35 U.S.C. 154(b) by 86 days.

(21) Appl. No.: 18/079,573

(22) Filed: Dec. 12, 2022

(65) Prior Publication Data
US 2023/0198256 A1 Jun. 22, 2023

(30) Foreign Application Priority Data
Dec. 21, 2021 (FR) ...................................... 2114068

(51) Int. Cl.
*H04L 45/28* (2022.01)
*H02J 3/00* (2006.01)

(52) U.S. Cl.
CPC ............ *H04L 45/28* (2013.01); *H02J 3/0012* (2020.01)

(58) Field of Classification Search
None
See application file for complete search history.

(56) References Cited

U.S. PATENT DOCUMENTS

| | | | | |
|---|---|---|---|---|
| 6,618,371 B1* | 9/2003 | Cao | .......................... | H04L 45/00 370/388 |
| 6,728,205 B1* | 4/2004 | Finn | ........................ | H04L 45/28 370/254 |
| 7,738,365 B2* | 6/2010 | Chao | ........................ | H04L 45/22 370/254 |
| 7,821,922 B1* | 10/2010 | Walton | ...................... | H04L 45/28 370/395.31 |
| 10,809,678 B2* | 10/2020 | Nasirian | ................. | G05B 15/02 |
| 11,271,623 B2* | 3/2022 | Qiang | ................... | H04B 7/0479 |

(Continued)

OTHER PUBLICATIONS

Daneshmand, et al., "Redundancy RF MEMS Multiport Switches and Switch Matrices", Journal of Microelectromechanical Systems, vol. 16, Issue: 2, pp. 296-303, Apr. 2007.

(Continued)

*Primary Examiner* — Muhammad Adnan
(74) *Attorney, Agent, or Firm* — BakerHostetler

(57) ABSTRACT

A system includes input or output channels linked to nominal and redundant equipment items, and at least one redundancy matrix for routing the signals of a channel from one equipment item to a redundant or nominal equipment item, represented by a connection grid having rows corresponding to the channels of the system and columns corresponding to the equipment items of the system, and connection points comprising: the points of intersection of a nominal path situated on a nominal diagonal of the connection grid, and the points of intersection of a redundant path of the connection grid situated between each row corresponding to a channel $C_i$ and a column corresponding to a redundant element $R_{f(i)}$ of index $f(i)$, $f$ being surjective, the redundancy matrix being implemented in the form of a circuit comprising switches arranged according to the connection grid.

19 Claims, 18 Drawing Sheets

(56) References Cited

U.S. PATENT DOCUMENTS

| | | | |
|---|---|---|---|
| 2005/0175017 A1* | 8/2005 | Christensen | H04L 45/583 370/396 |
| 2005/0201272 A1* | 9/2005 | Wang | H04L 45/48 370/216 |
| 2006/0253561 A1* | 11/2006 | Holmeide | H04L 45/48 707/E17.032 |
| 2008/0130491 A1* | 6/2008 | Chao | H04L 45/28 370/225 |
| 2008/0192625 A1* | 8/2008 | Aono | H04L 45/28 370/225 |
| 2008/0192727 A1* | 8/2008 | Pesusich | H04L 49/15 370/351 |
| 2013/0028142 A1* | 1/2013 | Beheshti-Zavareh | H04L 45/22 370/255 |
| 2013/0058349 A1* | 3/2013 | Khalil | H04L 45/28 370/400 |
| 2018/0102967 A1* | 4/2018 | Marsh | H04L 45/243 |
| 2019/0149461 A1* | 5/2019 | Camacho Villanueva | H04L 45/20 370/408 |

OTHER PUBLICATIONS

Figur, et al., "Simplified 16x8 RF MEMS switch matrix for a GEO-stationary data relay", 2012 The 7th German Microwave Conference, 2012.

* cited by examiner

Figure 15

REDUNDANCY MATRIX-BASED SYSTEM

CROSS-REFERENCE TO RELATED APPLICATION

This application claims priority to foreign French patent application No. FR 2114068, filed on Dec. 21, 2021, the disclosure of which is incorporated by reference in its entirety.

FIELD OF THE INVENTION

The invention relates generally to signal switching and in particular to a redundancy matrix-based system.

In some fields, it is known practice to use redundancy matrices to reroute the signals from the equipment items to redundant equipment items in case of failure on one equipment item.

BACKGROUND

For example, in the space industry, reconfiguration devices using networks of microwave frequency switches, constituting redundancy matrices, are implemented to reconfigure the equipment items of a satellite in an event of failure of the satellite. Such devices make it possible to ensure the reliability of the payload during the mission of the satellite.

A redundancy matrix consists of a network of switches.

Conventionally, the "redundancy matrix" function is fulfilled by equipment items called "redundancy rings", composed of multiple T-switches or R-switches interconnected according to a specific circuit.

With the constantly increasing number of channels and equipment items installed onboard the VHTSs (Very High Throughput Satellites), the complexity, the volume, the surface area and the cost of the redundancy matrices increase critically to the point of encroaching significantly onto the surfaces, the budget and the weight allocated to the embedded payload electronics.

For example, for the payloads of the satellites of VHTS (Very High Throughput Satellite) type, the number of channels and of equipment items increase a lot in comparison with the conventional payloads, which increases the complexity of the redundancy rings, their surface area, weight and costs by orders of magnitude. The surface area available to the embedded payload electronics is then significantly reduced.

The need to integrate the redundancy matrices more has sustained the development of more integrated switch technologies since MEMSs (Micro-Electro-Mechanical Systems), electronic switches, and micro-SPDT (miniaturised electromechanical switches).

These technologies have a common feature of being based on an elementary switching element of SPST (Single Pole Single Throw) type, which allows, depending on their respective integration capacity, the creation of more complex switches of nPmT (n Pole m Throw), R-switch, T-switch and C-switch types.

The known redundancy matrices rely generally on discrete electromechanical switches (coaxial T-switches or R-switch waveguide) mounted directly on the structure and interconnected by a radiofrequency loom and driven on the satellite by individual LLC control looms (PLDIU cards).

However, the level of integration of such devices conventionally produced from discrete electromechanical switches, individually controlled by the platform, has to be improved.

To improve the integration of the redundancy matrices, it is possible to envisage using specific switches such as, for example, switches with phase-change materials (PCMs), electronic switches or miniaturised electromechanical switches.

However, these components have an SPDT (Single Pole Double Throw) connectivity and not of R/T-switch type, which makes them electrically incompatible with the conventional RF electromechanical switches in terms of number of ports and switching states.

There are very few redundancy matrices that are compatible with the SPDT switches, and when they are compatible with the SPDT switches, they cause a major problem of dissymmetry between the paths (length of rows and number of switches crossed) which is reflected in prohibitive differential losses between the different pathways.

The existing redundancy matrices are in fact subject to strict constraints of attenuation disparity between the paths. In particular, when R/T-switches are fabricated from SPDT switches to be able to be referred to a conventional architecture, any attenuation disparity present in the reference architecture is amplified. This phenomenon of amplification of differential attenuation is all the more problematical since the conventional architectures are themselves largely unbalanced in terms of number of switches of R/T-switch types from one path to another.

It is also known practice to use redundancy matrices of "dedicated nominal matrix" type, compatible with SPDT switches (or, more generally, SPnT switches). In a "dedicated nominal matrix", each channel has exclusive access to one of the nominal equipment items. To ensure the redundancy function, each channel also has access to all the redundant equipment items.

However, such a matrix also has a natural asymmetry between the different paths. The attenuation difference between the best path and the worst path is all the greater when the number of channels is high.

There is thus a need for a device and a method for reconfiguring equipment items of a satellite using redundancy matrices allowing an improved level of integration and which are compatible with SPnT switches.

SUMMARY OF THE INVENTION

The invention improves the situation by proposing a system comprising a set of equipment items. The equipment items comprise one or more nominal equipment items and one or more redundant equipment items, a redundant equipment item being associated with one or more nominal equipment items, the system comprising n channels linked to said equipment items, the channels linked to the equipment items being input or output channels of the equipment items, the system comprising at least one redundancy matrix of n×m dimension configured to route the signals of a channel from a given equipment item to a redundant equipment item associated with said equipment item or to another nominal equipment item, in response to the detection of a rerouting-triggering event relating to an equipment item. Advantageously, each redundancy matrix is represented by a connection grid having a matrix representation comprising rows and columns, each row corresponding to a channel $C_{i, 0 \leq i < n}$ of the system and each column corresponding to an equipment item of the system. The connection grid comprises a set of connection points corresponding to a point of intersection between a channel and an equipment item, the connection points of the connection grid comprising at least:

all of the points of intersection of a nominal path comprising the points of intersection of the connection grid situated on a nominal diagonal of the connection grid, between each row corresponding to a channel of given index i and a column corresponding to a nominal equipment item of the same index i, and all of the points of intersection of a redundant path comprising the points of intersection of the connection grid situated at the intersection between each row corresponding to a channel $C_i$ of given index i and a column corresponding to a redundant element of index f(i) such that the function $f$ is a defined surjective function of the set $[\![0;n-1]\!]$ over $[\![0; m-n-1]\!]$ for any index i.

The redundancy matrix is implemented in the form of a circuit comprising a plurality of switches arranged according to the connection grid.

In one embodiment, each redundancy matrix is a sliding redundancy matrix and the connection points of the connection grid further comprise:

all of the points of intersection of a sliding path comprising the points of intersection of the connection grid situated on an upper diagonal of the connection grid, between each row corresponding to a channel $C_i$ of given index i and a nominal equipment item of index i+ (e−1) modulo n with e designating a sliding capacity of the matrix and e strictly greater than two, the sliding capacity being the number of points of the matrix situated between a given point of the nominal diagonal on a given column of the connection grid and a point of the upper diagonal situated on the same column of the connection grid.

Each redundancy matrix can be a sliding redundancy matrix, the sliding path further comprising the points of intersection of the connection grid situated on one or more intermediate diagonals of the connection grid, between each row corresponding to a channel $C_i$ of given index i and a nominal equipment item of index $E_{j+k\ modulo\ n}$, with (i,k) belonging to S and $S \subset [\![0;n-1]\!] \times [\![1; e-2]\!]$.

Advantageously, if n is strictly greater than zero and m is strictly greater than n+1, the sliding capacity e satisfies the following condition:

$$2 \leq e \leq \left\lfloor \frac{n}{m-n} \right\rfloor$$

A perfect redundancy matrix has a sliding capacity e satisfying the condition:

$e \geq m-n$.

In particular, a redundancy matrix of sliding capacity e=m−n is perfect if, and only if, all the points of the intermediate diagonals of the sliding path are connection points.

A perfect redundancy matrix has a perfection rate equal to one, the perfection rate representing the number of rerouting-triggering events covered by the redundancy matrix.

In embodiments, the system can comprise an input redundancy matrix associated with the input channels of the equipment items and an output redundancy matrix associated with the output channels of the equipment items.

The switches can be of SPnT type.

In one embodiment, the circuit implementing the redundancy matrix can be based on SPnT switch trees.

Advantageously, the circuit implementing the redundancy matrix can comprise a tree corresponding to each row and a tree corresponding to each column of the connection grid, the root of each SPnT switch tree of the circuit corresponding to a row of the connection grid associated with a channel or to a column of the connection grid associated with an equipment item.

In one embodiment, a tree of the circuit implementing the redundancy matrix connected to a row corresponding to a channel has as many branches as there are connection points on the row in the connection grid and a tree of the circuit implementing the redundancy matrix connected to a column corresponding to an equipment item has as many branches as there are connection points on the column in the connection grid.

In one embodiment, the trees corresponding to the rows of the connection grid are connected to the trees corresponding to the columns of the connection grid.

The system can be configured to manage a number of failures on the equipment items, the rerouting condition being the occurrence of a failure on an equipment item.

In one embodiment, the number of equipment failures managed by the system can be an increasing function of the sliding capacity of the matrix, when the intermediate diagonals are all full.

The embodiments of the invention provide a novel architecture of redundancy matrices using SPnT switches. Through its regular structure, such an architecture does not present the differential loss problems of the conventional architectures. On the contrary, it makes an individual balancing of the pathways possible.

The redundancy matrix architecture according to the embodiments of the invention relies on a step-by-step sliding technique to make use of all of the redundant equipment items installed on board without in any way revealing long paths, or paths containing a large number of switches.

Among other advantages, it offers a capacity to be simply subdivided into basic blocks and can be adjusted in complexity to meet the precise need for reliability on the payload.

BRIEF DESCRIPTION OF THE DRAWINGS

Other features, details and advantages of the invention will emerge on reading the description given with reference to the attached drawings, which are given by way of example and which represent, respectively:

FIG. 15 illustrates an example of a sliding redundancy matrix (hollow matrix), of 16×20 dimension, with intermediate filling.

DETAILED DESCRIPTION

Figure 1:
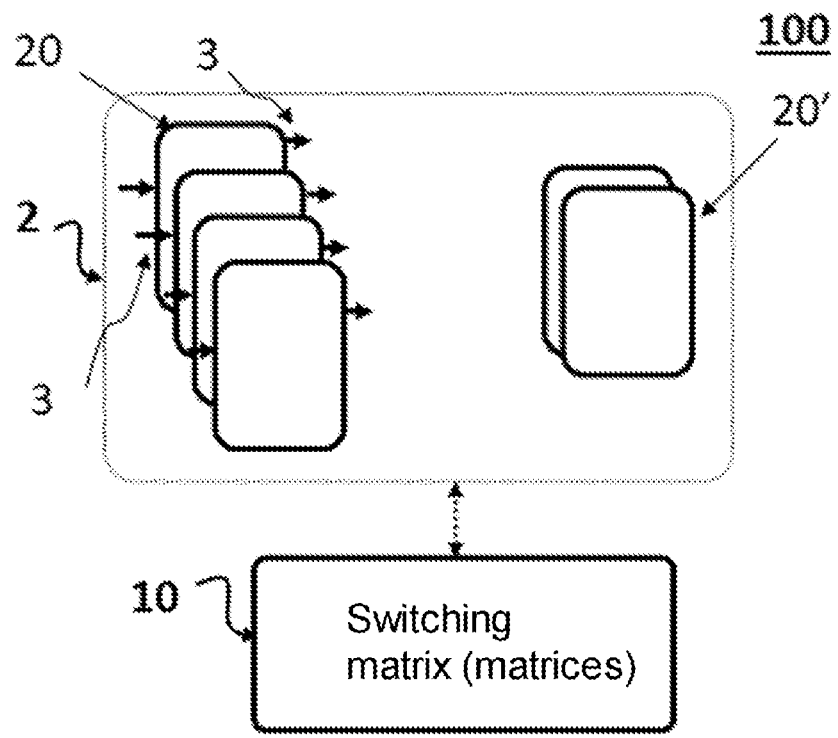
FIG. 1 schematically represents a system comprising a set of nominal and redundant equipment items, in which the redundancy matrix according to the embodiments of the invention can be used.

FIG. 1 schematically represents a system 100 comprising a set of equipment items 2.

An equipment item denotes a device or entity applying a certain operation to a signal arriving at its input to produce a signal at its output.

The equipment items 2 can comprise one or more nominal equipment items 20 and one or more redundant equipment items 20'.

A redundant equipment item 20' can be associated with one or more nominal equipment items 20.

The system 100 comprises at least one redundancy matrix 10 (also hereinafter called "switching matrix") configured to route the signals from a given equipment item 20 to another, operational redundant equipment item 20', associated with the given equipment item 20, or from a nominal equipment item 20 to another nominal equipment item 20, in response to the detection of a rerouting-triggering event relating to an equipment item.

In embodiments of the invention, the rerouting-triggering event (also called "switching matrix reconfiguration event") can be a change in a set of excluded equipment items. As used here, an "excluded equipment item" refers to an equipment item excluded from the list of the equipment items to which the channels can be connected (the change can, for example, be an exclusion of a new equipment item).

In an example of application of the invention to the management of failures, the set of the excluded equipment items comprises the equipment items in failure state following the occurrence of one or more failures. In such an embodiment, the triggering event is then the detection of a failure on an equipment item.

For a given subset of excluded equipment items, the role of a redundancy matrix is to try to connect each channel to a non-excluded equipment item. As used here, a redundant equipment item 20' denotes another operational equipment item, similar to the associating nominal equipment item, capable of performing the same function as the operational equipment item.

An equipment item 2 is said to be "operational" if it is not failed (not the subject of a failure) and is activated (not off).

In an example of application of the invention, the system 100 can, for example and without limitation, be a satellite. In such an application of the invention, the equipment items 2 then correspond to the equipment items of the payload of the satellite and are arranged on a radiofrequency chain. The redundancy matrices 10 are used to route radiofrequency (RF) signals of the channels from a nominal equipment item 20 to a redundant equipment item 20' of the system 100 or from a nominal equipment item 20 to another nominal equipment item 20.

In such an example of application of the invention to the space industry, the fact that it is impossible to ensure maintenance of the satellites in flight (system 100) requires the payloads to be made reliable by adding, throughout the RF chain, redundant equipment items 20', which remain off and therefore which do not age throughout the duration of the mission, until a failure of a given equipment item 20 occurs, unless one of the redundant equipment items 20' is put into service to replace a failed nominal equipment item 20. The redundancy matrices 10 are then used to subtract the failed equipment item 20 from the routing of the payload and the redundant equipment item 20' in its place.

For example, the redundancy matrices can be used to ensure the redundancy of equipment items 20 of frequency converter type.

Such redundancy matrices can also be used in optical applications.

The invention applies more generally to any system 100 in which redundancy matrices are used to reroute signals of the channels 3 from a nominal equipment item 20 to a redundant equipment item 20' or from a nominal equipment item 20 to another nominal equipment item 20.

For example, the redundancy matrix 10 according to the embodiments of the invention can be used in a test system 100 configured to test equipment items 20 of DUT (Device Under Test) type, the channels 3 then corresponding to the different measurement pathways (corresponding to the channels).

The system 100 can comprise as many channels 3 as useful signals.

The channels 3 comprise the input channels linked to the equipment items of the system or the output channels linked to the equipment items of the system, the redundancy matrix 10 then being configured to reroute the signals of the input channels and/or of the output channels of the nominal equipment items 20.

An equipment port corresponds to the interface between the redundancy matrix 10 and the input or the output of an equipment item 2.

A channel denotes a pathway of arrival of a signal having to be processed by an equipment item, or a pathway of departure of a signal having been processed by an equipment item.

A channel port denotes an interface between the redundancy matrix and a channel.

Figure 2:
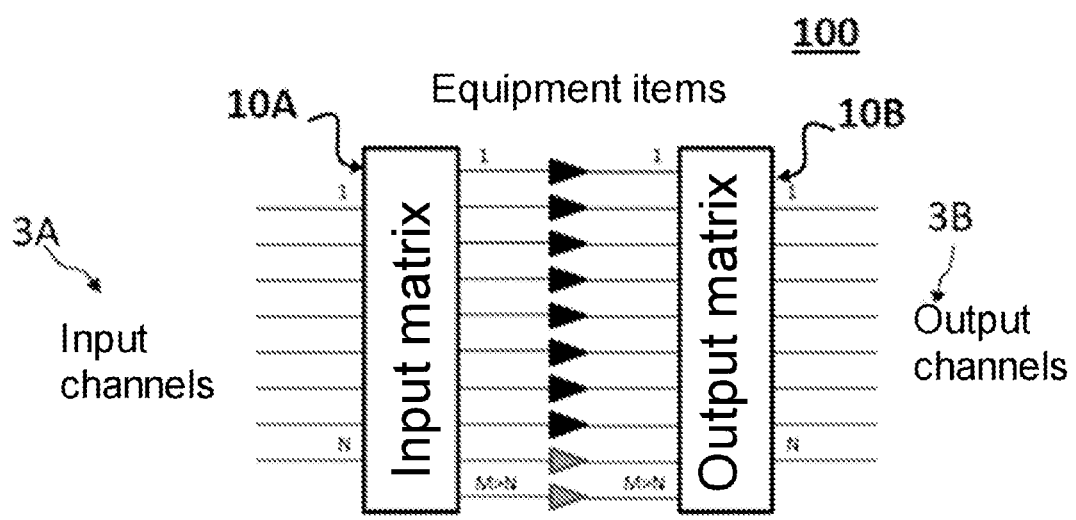
FIG. 2 represents a system comprising a pair of redundancy matrices, according to an embodiment of the invention.

FIG. 2 represents a system 100 comprising a pair of redundancy matrices, according to an embodiment of the invention.

The pair of redundancy matrices comprises a first redundancy matrix 10A (input matrix) and a symmetrical second matrix 10B arranged at the output (output matrix) bracketing the nominal equipment items 20. In such an embodiment, the first redundancy matrix 10A arranged upstream of the equipment items 20 is configured to distribute the signals of the input channels 3A to redundant equipment items 20' while the second redundancy matrix 10B performs a function symmetrical to that of the first redundancy matrix 10A by recovering the signals from the nominal equipment items 20' and rerouting them to the output channels 3B for transparent management of the rerouting and continuity of service.

In the case of an input matrix 10A situated upstream of the equipment items, the inputs of the matrix (rows) correspond to the channel ports, while the outputs of the matrix (column) correspond to the equipment ports.

In the case of an output matrix 10B situated downstream of the equipment items, the inputs of the matrix (rows) correspond to the equipment ports, while the outputs of the matrix (columns) correspond to the channel ports.

To make it easier to understand the invention, the rest of the description will be given primarily with reference to an input matrix in which the rows correspond to the channel ports and the columns correspond to the equipment ports. However, the person skilled in the art will easily understand that the embodiments described hereinbelow apply likewise to the output matrices.

Each redundancy matrix 10 is associated with a connection grid representing the connectivity of the matrix, the redundancy matrix being implemented in the form of a circuit from the connection grid. The connection grid represents the connection points (or connection nodes) between a given channel $C_i$ and a nominal equipment item $E_j$ (20), and the connection points between a given channel $C_i$ and a redundant equipment item $R_k$ (20').

Advantageously, a circuit implementing the redundancy matrix comprises a pair of SPDT switches for each connection point of the connection grid.

Hereinafter in the description, the reference 10 will be used to denote the redundancy matrix, its connection grid or the circuit implementing the connection grid.

The system 100 can rely on a chosen redundancy scheme. A "P for K" redundancy scheme defines the number P of redundant equipment items 20' for K nominal equipment items 20.

An equipment item can be composed of one or more components.

In an application of the invention to the satellite systems, an equipment item can for example combine several amplifiers or frequency converters.

As a variant, an equipment item can be a single component, such as an amplifier or an individual frequency converter.

An equipment item 20 can thus have one or more input pathways and one or more output pathways.

The connection grid of the redundancy matrix 10 has a matrix representation comprising rows $L_i$ and columns $T_j$.

The index i corresponds to the index of i-th row and the index j corresponds to the index of the j-th row.

Each row of the redundancy matrix 10 represents an input of the redundancy matrix 10, and each column represents an output of the redundancy matrix 10.

Thus, in the embodiments of the invention in which the redundancy matrix 10 is used to connect a channel 3 with an equipment item 2, each row of the connection grid corresponds to a channel of the system 3 and each column of the connection grid corresponds to an equipment item 2 of the system 100.

Each row $L_i$ thus corresponds to a channel $C_i$ while each column $T_j$ corresponds to an equipment item 20 which can be a nominal equipment item $E_j$ or a redundant equipment item $R_j$ associated with one or more nominal equipment items.

Hereinafter in the description, the parameter n will be used to denote the total number of channel ports 3 (number of rows) of a redundancy matrix. The channel ports of a redundancy matrix 10 will be denoted $C_{i, 0 \leq i < n}$.

The parameter m will be used to denote the total number of equipment ports 2 (number of columns) of the redundancy matrix. Of these equipment ports, n equipment items (corresponding to n columns of the connection grid) are said to be "nominal" and will be denoted $E_{i, 0 \leq i < n}$. The other equipment items 20' are said to be "redundant" and will be denoted $R_{j, 0 \leq j < m-m}$.

The connection grid associated with the redundancy matrix 10 therefore has an n×m dimension (n rows and m columns).

Each intersection between a row $L_i$ and a column $T_j$ represents a possible connection between the channel $C_i$ corresponding to the row $L_i$ and the equipment item 20 ($E_j$ or $R_j$) corresponding to the column $T_j$.

Only some of the intersections of the connection grid correspond to connection points between a channel 3 and an equipment item 2.

The connection grid is configured in such a way that only a single connection is possible simultaneously, that is to say that a row $L_i$ can be connected only to a single column $T_j$ and, conversely, a column $T_j$ can be connected only to a single row $L_i$.

A group of nominal equipment items 20 denotes the set of the nominal equipment items 20 which are associated with one and the same redundant equipment item 20'.

According to the embodiments of the invention, the connection grid of the redundancy matrix 10 is configured such that a channel $C_i$ can have possible connection points with more than one nominal equipment item 20 to manage the occurrence of a number of successive failures (more generally a number of occurrences of a rerouting-triggering event) on a group of equipment items associated with one and the same redundant equipment item. Moreover, the connection grid associated with the redundancy matrix 10 comprises only one connection between a given channel $C_i$ and a redundant equipment item $R_j$ (20'). In the event of failure on an equipment item $E_j$, the channel $C_i$ associated with the failed equipment item $E_j$ will be connected to a redundant equipment item $R_{f(i)}$ that is predetermined on the basis of the possible points of connection of the channel $C_i$ with the equipment items $E_k$. A channel $C_i$ will be connected as a priority to a predetermined redundant equipment item $R_{f(i)}$ if it is available.

To make it easier to understand the invention, simplified connection grid configurations associated with the redundancy matrix 10 will be described in relation to FIGS. 3 to 7.

Figure 3:
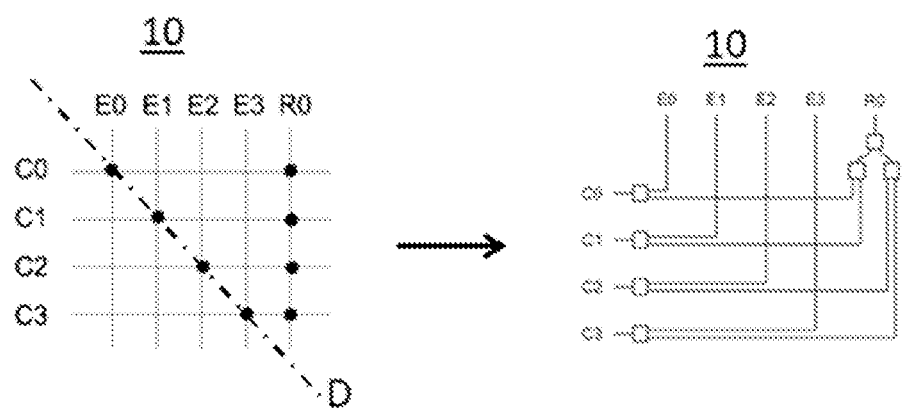
FIG. 3 represents an example of redundancy matrix relying on a 1-for-4 redundancy scheme, with one redundant equipment item for 4 nominal equipment items.

FIG. 3 represents an example of redundancy matrix 10 relying on a 1-for-4 redundancy scheme, that is to say with one redundant equipment item 20' for 4 nominal equipment items 20.

FIG. 3 shows an example of a simplified redundancy matrix 10 of 4*5 size on the left, represented in the form of a connection grid, and on the right in an SPDT implementation. The redundancy matrix of FIG. 3 is associated with 4 nominal equipment items $E_i$ (20) and 1 redundant equipment item $R_0$ (20') associated with the 4 equipment items. The redundancy matrix 10 comprises 4 channel ports $C_i$, each channel $C_i$ being connected to an equipment item $E_i$ of the same index i on the nominal diagonal D of the matrix.

With such a redundancy matrix 10 (represented by the connection grid of FIG. 3), each channel $C_i$ can be connected to its nominal equipment item $E_i$ (20) or to the associated redundant equipment item $R_0$ (20'), if the equipment item $E_i$ fails.

Figure 4:
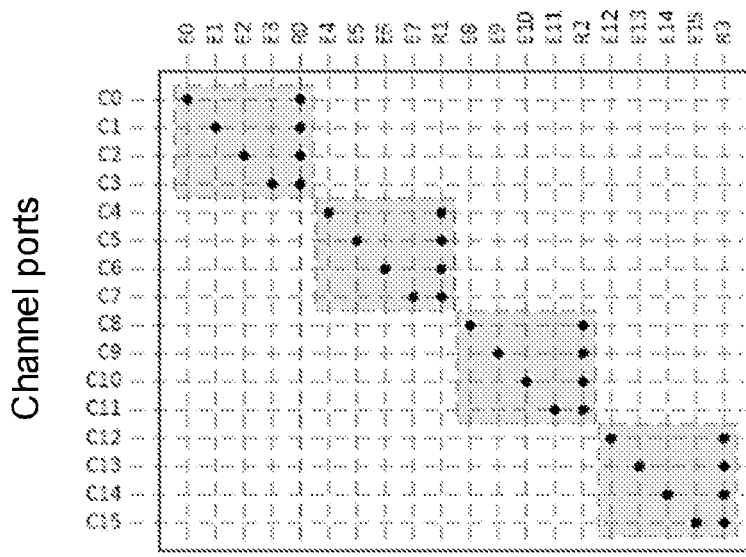
FIG. 4 represents another example of redundancy matrix having a 1-for-4 redundancy scheme used in a system comprising 16 channels and 16 equipment items.

FIG. 4 represents another example of a redundancy matrix 10 having a 1-for-4 redundancy scheme used in a system 100 comprising 16 channels 3 and 16 equipment items 20. The system 100 uses 4 redundant equipment items 20' and 4 redundancy matrices 10 that are juxtaposed to satisfy the 1-for-4 redundancy scheme, with the simplest possible implementation. In FIG. 3, a redundant equipment item $R_j$ is placed after the 4 nominal equipment items $E_i$ (20) which are associated with it. The redundancy matrix is of 16*20 size (20 columns corresponding to the 16 nominal equipment items $E_j$ and to the 4 redundant equipment items $R_{j_k}$) and juxtaposes four 4×5 matrices.

Figure 5:
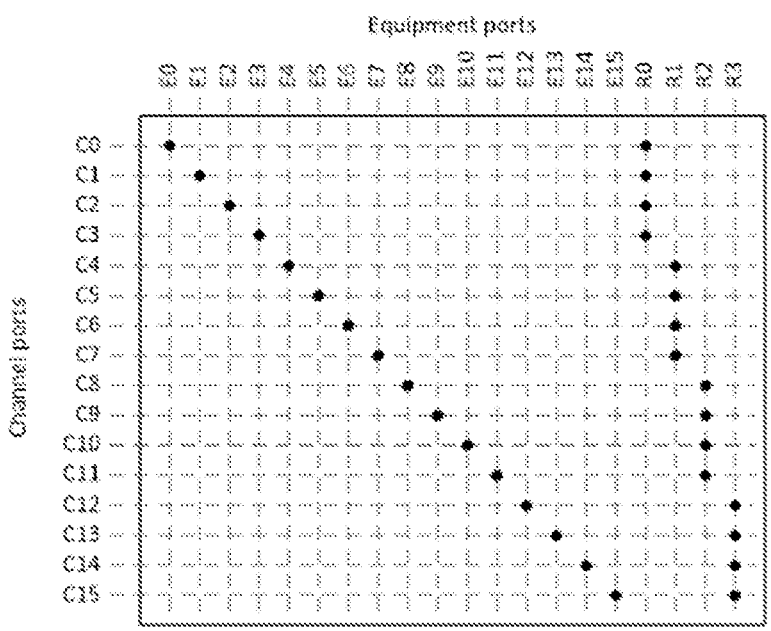
FIG. 5 represents a redundancy matrix having a connectivity similar to the matrix of FIG. 4, but with a grouping together of the nominal equipment items and of the redundant equipment items.

FIG. 5 represents a redundancy matrix 10 corresponding to that of FIG. 3 with modifications to have an equivalent connectivity, but with a grouping together of the nominal equipment items $E_j$ (20) in the n first columns and of the redundant equipment items $R_j$ (20') in the m-n last columns. The diagonal of this matrix corresponds to the nominal diagonal. The nominal diagonal comprises all of the points of intersection of the redundancy matrix 10 between each row corresponding to a channel $C_i$ of given index i and a column corresponding to a nominal equipment item $E_i$ having the same index i.

It should be noted that the swapping of rows or columns does not alter the connectivity described by the connection grid.

A connection between a channel $C_i$ and an equipment item $E_j$ will hereinafter be denoted ($C_i \leftrightarrow E_j$). Likewise, a connection between a channel $C_i$ and a redundant equipment item $R_j$ will hereinafter be denoted ($C_i \leftrightarrow R_j$).

Thus, in the matrix configuration of FIG. 5, the n first columns of the redundancy matrix 10 correspond to the nominal equipment items $E_j$ (20), while the m-n subsequent columns successively comprise the redundant equipment items $R_{j_k}$ (20'), with n=16 and m-n=4. The nominal equipment items $E_j$ (20) of one and the same group of nominal equipment items (i.e. associated with one and the same redundant equipment item 20') are themselves disposed one after the other and the order of the redundant equipment items corresponds to the order of the groups of associated nominal equipment items in the n first columns.

Such a redundancy matrix 10 makes it possible to switch any channel $C_i$ (3) to the associated redundant equipment item $R_k$ (20) on the 1st failure, the index k of the corresponding redundant equipment item being given by $k=\lfloor i/K \rfloor$ (in the example of FIG. 5, K=4), in a "P-for-K" redundancy scheme.

It should be noted that such switching on the first failure is possible without requiring other equipment items 20 to be disconnected, which satisfies the constraints linked to the redundancy rings whereby the channels other than that corresponding to the failed pathway on the first failure must not be disconnected.

If it is assumed that a second failure then occurs on an equipment item $E_j$ in a group of equipment items $G_q$ other than the group $G_k$ associated with the redundant equipment item $R_k$, the channel $C_j$ can be connected to the redundant equipment item $R_q$ with $q=\lfloor j/K \rfloor \neq k$ and thus reroute the signals of the channel $C_j$ to the redundant equipment item $R_j$.

However, with such a redundancy matrix configuration, the channel $C_j$ cannot be rerouted if a failure occurs on an equipment item $E_j$ belonging to the same group of equipment items $G_k$ as that associated with $R_k$, because such an equipment item is associated with the same redundant equipment item.

The redundancy matrix 10 can be configured to allow the rerouting of two channels associated with two equipment items of one and the same group of equipment items to a redundant equipment item for one of the channels and to a neighbouring equipment item determined according to the sliding principle (the neighbouring equipment item will itself be routed to its neighbouring equipment item and so on until the redundant equipment item of the next group can be reached). Such a redundancy matrix, hereinafter called "sliding redundancy matrix", is configured to "slide" all the channels $C_i$ associated with another equipment item $E_j$, of the same group $G_k$ of index higher than that of the failed first equipment item $E_j$ so the neighbouring equipment item $E_{j'+1}$ and to get the redundant equipment item of the neighbouring group of equipment items $G_{k+1}$ in the event of failure of the equipment item $E_j$, of the same group, by adding connection points. Thus, if a first equipment item $E_j$ fails in a group $G_k$ associated with a redundant equipment item $R_k$, the channels $C_{j'}$ associated with the other equipment items $E_{j'}$ of the same group, of index $j'>j$, will be connected to the neighbouring equipment item $E_{j'+1}$ of next index $j'+1$ in the event of failure of the equipment item $E_j$, so as to be rerouted to the redundant equipment item of the neighbouring group of equipment items $G_{k+1}$ by virtue of the addition of auxiliary connection points between $C_{j'}$ and $E_{j'+1}$.

Figure 6:
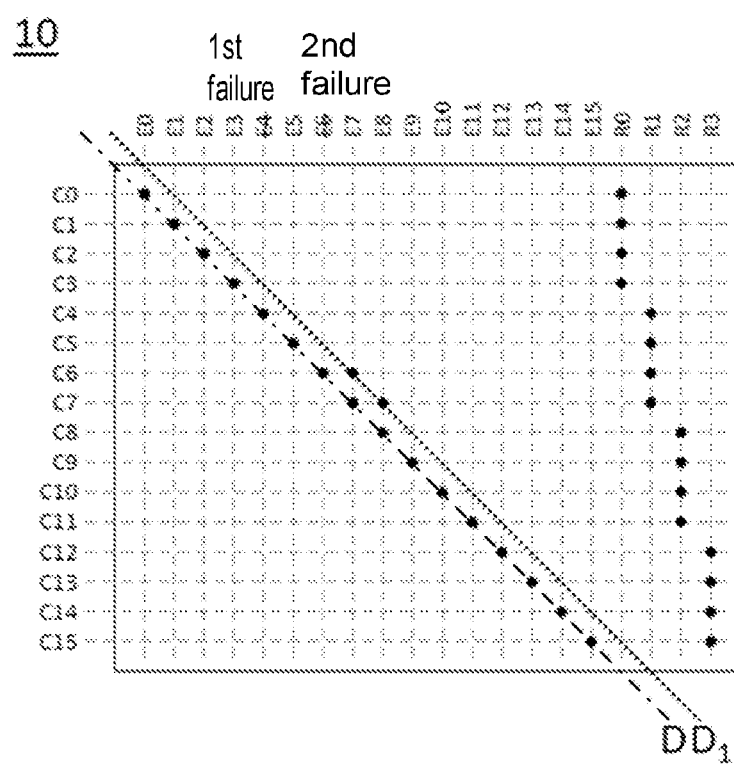
FIG. 6 illustrates an example of sliding redundancy matrix of 16×20 size composed of four 4×5 matrices, suitable for managing a second specific failure, in one and the same group of nominal equipment items.

FIG. 6 illustrates a sliding redundancy matrix 10 of 16×20 size composed of four 4×5 matrices. It shows the addition of connection points in the redundancy matrix 10 to ensure the continuity of service in the case of a second specific failure.

In this example, it is considered that a first failure occurs in an initial state such that i=4 is the index of the first failure (failure of the equipment item $E_4$ associated with the channel $C_4$), then, subsequently, a second failure of index j=6 occurs (failure on the equipment item $E_6$ associated with the channel $C_6$). The two failed equipment items $E_4$ and $E_6$ belong to the same group $G_1$ of 4 equipment items associated with one and the same redundant equipment item $R_1$. Thus, all the equipment items of the group $G_1$ (i.e. $E_4$, $E_5$, $E_6$ and $E_7$) are initially configured to be connected to the redundant equipment item $R_1$ in the event of failure of one of them. However, this embodiment with a sliding redundancy matrix 10 makes it possible to modify the active connection between a channel and an equipment item in the case where a failure occurs successively on more than one equipment item of one and the same group. Thus, upon the first failure on $E_4$, the active connection ($C_4 \leftrightarrow E_4$) becomes the point ($C_4 \leftrightarrow R_1$). Then, upon the second failure, by adding the connection points ($C_6 \leftrightarrow E_7$) and ($C_7 \leftrightarrow E_8$) by shifting the equipment items $E_6$ and $E_7$ of index higher than i=6 in the group $G_1$ to the next equipment items $E_7$ and $E_8$, and by activating them, the channel $C_6$ is connected to $E_7$ (instead of $E_6$), the channel $C_7$ is connected to $E_8$ (instead of $E_7$) and, finally, the channel $C_8$ is connected to $R_2$. The added connection points thus make it possible to produce a step-by-step sliding of the channels to the next redundant equipment item $R_2$.

The redundancy matrix 10 can thus be improved to allow the processing of two failures occurring successively on two equipment items within one and the same group of equipment items by applying a generalisation by recurrence of the sliding method.

Thus, in one embodiment, the redundancy matrix 10 has a neighbouring diagonal $D_1$ of the nominal diagonal D, which is full (that is to say that all the points of the neighbouring diagonal to the nominal neighbour correspond to additional connection points that can be activated between a channel $C_i$ and a neighbouring equipment item $E_{i+1}$ of an equipment item $E_i$ connected to the same channel on the nominal diagonal).

The redundancy matrix then comprises connections ($C_i \leftrightarrow E_i$) on the nominal diagonal D and auxiliary connections ($C_i \leftrightarrow E_{(i+1) \bmod N}$) on the neighbouring diagonal $D_1$ for all the values of i between 0 and N−1.

Figure 7:
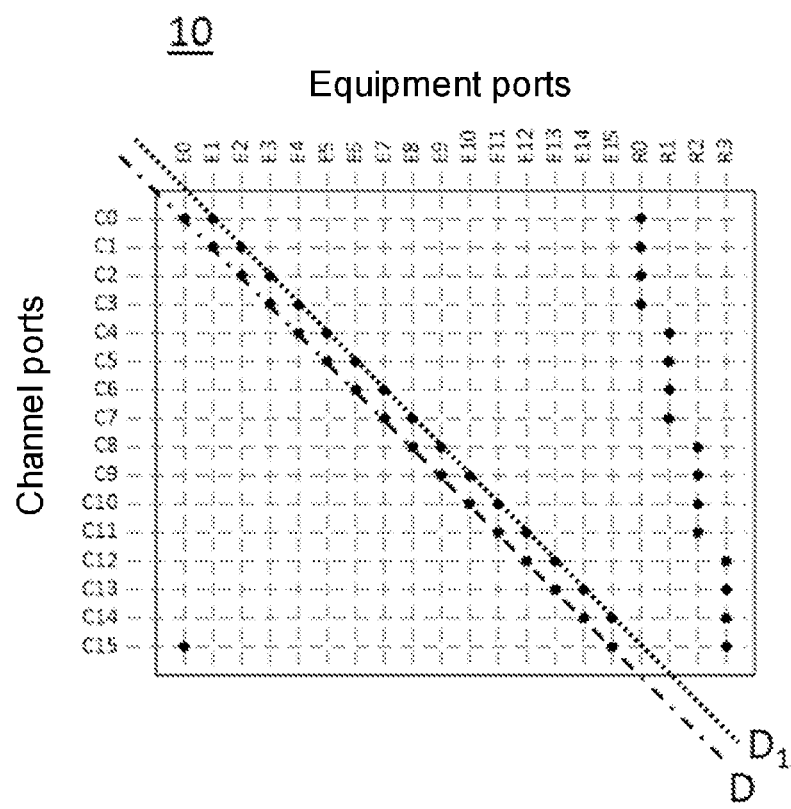
FIG. 7 represents a sliding redundancy matrix of 16×20 dimension comprising a nominal diagonal and one full neighbouring diagonal, according to an embodiment of the invention suitable for managing any combination of two failures among the equipment items.

FIG. 7 represents a sliding redundancy matrix comprising a nominal diagonal D and a full neighbouring diagonal $D_1$, according to an embodiment of the invention. The redundancy matrix 10 is of 16×20 dimension and is composed of four interconnected submatrices of 4×5 dimension.

It can be seen that, in the neighbouring diagonal $D_1$, a connection point is added between the last channel of greatest index $C_{15}$ and the first equipment item of smallest index $E_0$ ($C_{15} \leftrightarrow E_0$) in order to allow a sliding of the last group $G_4$ of four equipment items ($E_{12}$, $E_{13}$, $E_{14}$, $E_{15}$), associated with the last redundant equipment item of greatest index $R_3$, to the first group $G_1$, associated with the first redundant equipment item $R_0$, thus closing the sliding loop.

In another embodiment, the redundancy matrix 10 can also be enhanced to allow the processing of more than two failures occurring in succession on three equipment items in one and the same group of equipment items via once again applying a generalisation by recurrence of the sliding method.

More specifically, in one embodiment, the redundancy matrix 10 can have L neighbouring diagonals $D_l$ of the nominal diagonal, that are full, with L=e−1 (L designates the number of neighbouring diagonals, without the nominal diagonal).

For the l-ith neighbouring diagonal $D_l$, all the points of the neighbouring diagonal $D_l$ correspond to an additional connection between a channel $C_i$ and a neighbouring equipment item $E_{i+l}$ of an equipment item $E_i$ connected to the same channel $C_i$ on the nominal diagonal D.

The redundancy matrix then comprises connections ($C_i \leftrightarrow E_i$) on the nominal diagonal and auxiliary connections ($C_i \leftrightarrow E_{(i+t) \bmod N}$) on each neighbouring diagonal $D_l$ for all the values of i between 0 and n−1.

Figure 8:
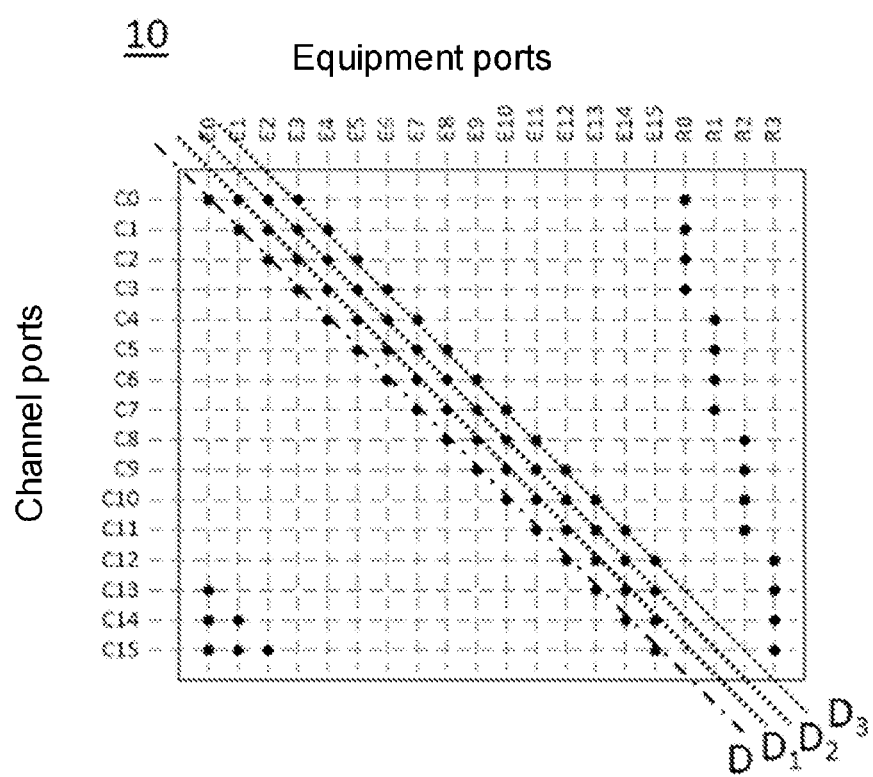
FIG. 8 represents an example of a sliding redundancy matrix comprising one nominal diagonal and three full neighbouring diagonals, according to an embodiment of the invention suitable for managing any combination of four failures among the equipment items.

FIG. 8 represents a sliding redundancy matrix comprising one nominal diagonal D and three full neighbouring diagonals $D_1$, $D_2$ and $D_3$, according to an embodiment of the invention. The redundancy matrix 10 is of 16×20 dimension and is composed of four interconnected submatrices of 4×5 dimension. Four redundant equipment items are used, $R_0$, $R_1$, $R_2$, and $R_3$. The redundancy matrix of FIG. 8 makes it possible to reroute the channels to redundant equipment items even when 4 failures occur in succession on the equipment items of one and the same group.

The redundancy matrix 10 that is thus produced is perfect, which means that, for any combination of failures of K equipment items (K less than or equal to the number of redundant equipment items), there is a configuration of the redundancy matrix that guarantees continuity of service of the system by rerouting all the channels associated with the faulty equipment items to a functional equipment item (redundant equipment item).

A perfect N×M matrix by definition supports any combination of M−N failures out of the M equipment items (without distinction between nominal equipment items and redundant equipment items). For example, the 16×20 matrix of FIG. 8 supports any combination of 4 failures among the 20 equipment items and a perfect 27×30 matrix supports any combination of 3 failures.

Contrary to the existing solutions, the use of such a redundancy matrix by the system 100 makes it possible to minimise the dissymmetry in the number of switches crossed between paths, regardless of the number of failures. It also makes it possible to distribute the redundant equipment ports $R_k$ in the redundancy matrix such that the matrix has a subdivision based on elementary blocks, allowing a modular mechanical architecture.

In fact, the redundancy matrix according to the embodiments of the invention is used to produce a hardware implementation (circuit) in the form of an arrangement of miniaturised switches mounted on printed circuit boards. The surface area of a printed circuit may be insufficient to accommodate all of the circuit (and notably all the switches). The circuit can then be produced by using several distinct boards, which are themselves potentially mounted in distinct mechanical structures by using the elementary block subdivision.

An elementary block corresponds to a subset of the complete circuit implementing the redundancy matrix.

Figure 9:
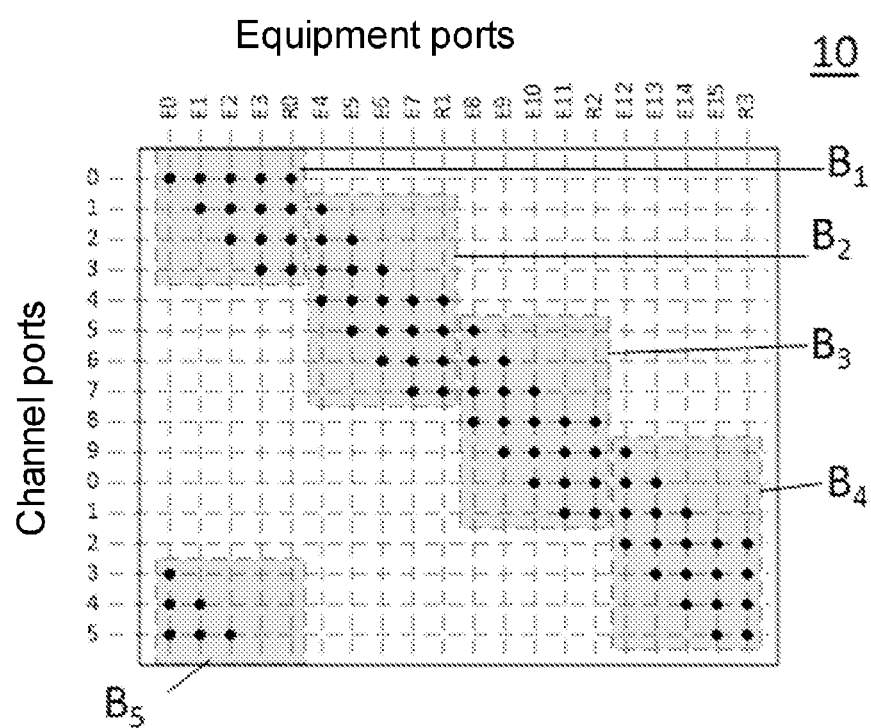
FIG. 9 illustrates a subdivision of a sliding redundancy matrix of 16×20 dimension into four elementary rectangular blocks, according to an exemplary embodiment.

FIG. 9 illustrates such a subdivision, of a sliding 16×20 redundancy matrix, into four elementary rectangular blocks $B_1$, $B_2$, $B_3$ and $B_4$, according to an exemplary embodiment. A rectangular block is formed around contiguous connections associated with each group of equipment items. One group of equipment items can be associated with two elementary blocks.

Advantageously, the elementary blocks require a limited number of interconnections (limited number of RF cables) and use an interconnection topology in the form of a simple loop (B1→B2→B3→B4→B1), which allows the use of short cables.

More specifically, the number of interconnections between one block Bk and the next Bk+1 is equal to the number of sliding diagonals (e−1).

The elementary block subdivision further allows an optimisation of the nonrecurrent development cost. Rather than developing a new product for each redundancy matrix dimension, a set of constructed elementary blocks can be simply assembled for subsequent uses.

It should be noted that a printed circuit board can in some cases be wide enough to accommodate several blocks. For example, one PCB (Printed Circuit Board) can incorporate the blocks B1 and B2 and another PCB can incorporate the blocks B3 and B4. However, in such cases, it is advantageous to minimise the number of interconnections between the blocks B2 and B3 and between B4 and B1.

The connection grids describe a connectivity, and not a mechanical arrangement (the switching of rows or of columns does not affect this connectivity). The redundant equipment items 20' can be represented at the end of the connection grid (last columns in the figures) to highlight the diagonals. In FIG. 9, the redundant equipment items 20' are distributed among the nominal equipment items 20 to highlight the elementary blocks.

To further optimise the structure of the redundancy matrix 10, in embodiments, a redundancy matrix 10 can be under-populated, by eliminating connection points, which makes it possible to simplify the hardware implementation of the SPnT switches, and thus to reduce the complexity of the redundancy matrix.

Hereinafter in the description, a rate of perfection of a redundancy matrix will be referred to.

In general applications of the invention, the redundancy matrix reconfiguration event is the changing of the excluded set (in an application of the invention to failure management, the exclusion of an equipment item is triggered by a failure of that equipment item).

A matrix is perfect if, for any subset of excluded equipment items, it is capable of connecting each channel to a non-excluded equipment item (providing that there are as many non-excluded equipment items as channels).

As used here, the rate of perfection $PL_k$ of a redundancy matrix 10 with n inputs and m outputs is defined by:

$$PL_k = \frac{|\{\text{combinations of } k \text{ exclusions covered}\}|}{|\{\text{combinations of } k \text{ exclusions}\}|}$$

also:

$$PL_k = \frac{|\{\text{combinations of } k \text{ exclusions covered}\}|}{C_M^k} \quad (1)$$

For example, in an application of the invention to failure management, the rate of perfection of a redundancy matrix 10 denotes the number of failures covered by the redundancy matrix, divided by the total number of possible failures. The matrix is said to be "perfect" when this number is equal to 1.

Thus, in this example of application of the invention to failure management, for a redundancy matrix with n inputs and m outputs, the rate of perfection $PL_k$ on the $k^{th}$ failure is defined as:

$$PL_k = \frac{|\{\text{combinations of } k \text{ failures covered}\}|}{|\{\text{combinations of } k \text{ failures}\}|} = \frac{|\{\text{combinations of } k \text{ failures covered}\}|}{C_M^k}$$

An under-populating of the redundancy matrix 10 could in some cases degrade the rate of perfection of the matrix, but with a very gradual reduction of the reliability of the subsystem composed of a set of equipment items, including nominal equipment items 20 and redundant equipment items 20', bracketed by two redundancy matrices 10 according to embodiments of the invention.

However, an under-populated redundancy matrix 10 allows a hardware simplification and therefore a reduction of the cost and therefore a good trade-off in rate of perfection/complexity of the hardware structure of the redundancy matrix.

Figure 10:
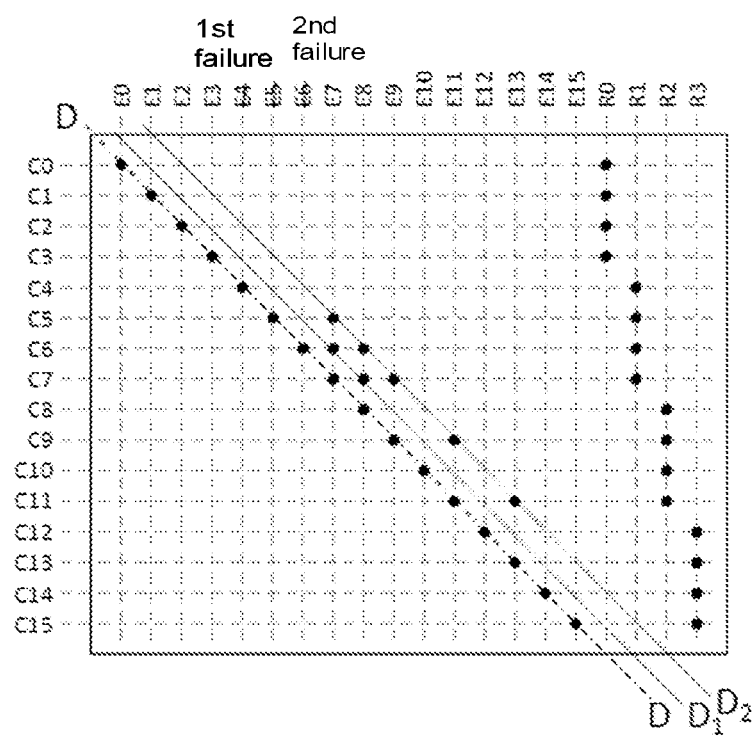
FIG. 10 represents a sliding redundancy matrix of 16×20 dimension, configured to manage 3 specific failures.

FIG. 10 represents a sliding redundancy matrix of 16×20 dimension, according to another example, configured to manage 3 specific failures. This redundancy matrix 10 makes it possible to illustrate the connection points that can be eliminated to implement the sliding and under-populated redundancy matrix embodiment. The redundancy matrix of FIG. 10 is obtained from the matrix structure of FIG. 6 (management of first two failures on $E_4$ and $E_6$), by adding in addition connection points according to the sliding method to ensure the continuity of service in the case of a $3^{rd}$ failure on $E_5$:

the channel $C_4$ is rerouted to $R_1$ for the $1^{st}$ failure on $E_4$;

for the $2^{nd}$ failure on $E_6$, the channel $C_6$ is rerouted to $E_7$, $C_7$ is rerouted to $E_8$, then $C_8$ is rerouted to $R_2$, by virtue of the addition and the activation of the connections $(C_6 \leftrightarrow E_7)$, $(C_7 \leftrightarrow E_8)$ and $(C_8 \leftrightarrow R_2)$ to manage a $2^{nd}$ failure; thus $R_2$ compensates for the loss of the equipment item $E_6$;

for the $3^{rd}$ failure on $E_5$, the channel $C_5$ is rerouted to $E_7$, $C_7$ is rerouted to $E_9$, $C_9$ is rerouted to $E_{11}$, $C_{11}$ is rerouted to $E_{13}$, and finally $C_{13}$ is rerouted to $R_3$ by virtue of the addition of and the activation of the connections $(C_5 \leftrightarrow E_7)$, $(C_7 \leftrightarrow E_9)$, $(C_9 \leftrightarrow E_{11})$, $(C_{11} \leftrightarrow E_{13})$ and $(C_{13} \leftrightarrow R_3)$ to manage a third failure.

The nodes $(C_6 \leftrightarrow E_7)$, $(C_7 \leftrightarrow E_8)$ and $(C_8 \leftrightarrow R_2)$ linked to the $2^{nd}$ failure will be replaced by the nodes $(C_6 \leftrightarrow E_8)$ and $(C_8 \leftrightarrow R_2)$ to allow the node $(C_5 \leftrightarrow E_7)$ to be established.

It should be noted that these connection additions reveal a third neighbouring diagonal $D_2$, higher than the second neighbouring diagonal $D_1$.

In the embodiment of the sliding and under-populated redundancy matrix 10, the connection points correspond to the connections added to the second failure on $E_6$, i.e. the points $(C_6 \leftrightarrow E_7)$ and $(C_7 \leftrightarrow E_8)$, can advantageously be eliminated, while retaining the capacity of the redundancy matrix to manage the $2^{nd}$ and $3^{rd}$ failures using the connection points added for the $3^{rd}$ failure.

Figure 11:
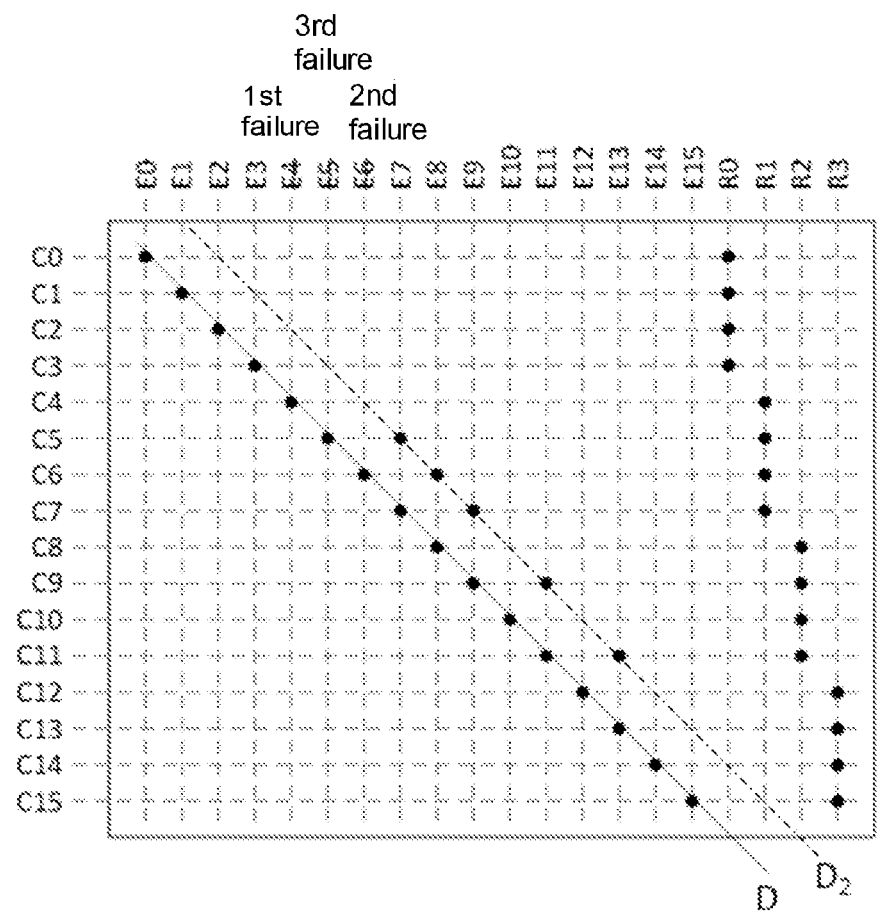
FIG. 11 represents a sliding redundancy matrix with hollow diagonal.

FIG. 11 illustrates such a simplification of the redundancy matrix (of 16×20 dimension composed of 4 interconnected 4×5 submatrices).

FIG. 11 shows the importance of the top diagonal $D_3$. Such a diagonal has a predominant weight of the rate of perfection.

In the embodiments of the invention, the depopulating of the redundancy matrix thus affects only the intermediate diagonals, which can thus be at least partially eliminated, while the highest diagonal is retained.

FIG. 11 shows the elimination of the points $(C_6 \leftrightarrow E_7)$ and $(C_7 \leftrightarrow E_8)$, the connection points added by sliding to manage a $3^{rd}$ failure (here on $E_5$) making it possible to manage the $2^{nd}$ failure (here on $E_6$). To manage the $3^{rd}$ failure:

the equipment item $E_6$ is indirectly replaced by $R_2$, upon a $2^{nd}$ failure on $E_6$ by virtue of the addition and the activation of the connection $(C_6 \leftrightarrow E_8)$ and of the connection $(C_8 \leftrightarrow R_2)$ added to manage a $3^{rd}$ failure (the channel $C_6$ is connected to $E_8$ and the channel $C_8$ is connected to $R_2$);

the equipment item $E_5$ is indirectly replaced by $R_3$. for the $3^{rd}$ failure on $E_5$, by virtue of the addition and the activation of the connections $(C_5 \leftrightarrow E_7)$, $(C_7 \leftrightarrow E_9)$, $(C_9 \leftrightarrow E_{11})$, $(C_{11} \leftrightarrow E_{13})$ and $(C_{13} \leftrightarrow R_3)$; thus, upon the $3^{rd}$ failure, the channel $C_5$ is connected to $E_7$, the channel $C_7$ to $E_9$, the channel $C_9$ to $E_{11}$, the channel $C_{11}$ to $E_{13}$, which brings about the connection of the channel $C_{13}$ which is connected to $R_3$.

Thus, in embodiments, the redundancy matrix 10 can have hollow diagonals such that, given an equal number of diagonals, the "highest" diagonals $D_l$ (of upper rank l) make it possible to cover a greater number of failures than the neighbouring diagonals of lower rank (of upper rank l).

The redundancy matrices 10 in which the neighbouring diagonals of intermediate rank I are entirely or partially eliminated (1≤l<L in which L is the total number of neighbouring diagonals) will hereinafter be called "sliding redundancy matrix with hollow diagonal" or "under-populated sliding redundancy matrix" (i.e. redundancy matrices in which neighbouring diagonals of intermediate rank l are not completely filled with nodes).

Such sliding redundancy matrices with hollow diagonal are not perfect. Indeed, they have a rate of perfection strictly less than 1. However, the elimination of intermediate diagonals, rather than the "high" neighbouring diagonal, corresponding to the diagonal $D_L$ of highest rank L, makes it possible to obtain matrices with a higher rate of perfection.

The embodiments thus provide a sliding redundancy matrix 10 defining connection points on the one hand between the channels (rows of the matrices) and the nominal equipment items and, on the other hand, between channels and redundant equipment items for the rerouting of a channel 3 to a redundant equipment item 20' in the case of one or more failures of the nominal equipment items 20.

The "sliding redundancy matrix" thus makes it possible to define the connectivity of the system 100, that is to say the set of connections permitted between the channel 3 ports and the equipment item 20/20' ports. This connectivity is described by the positioning of connection nodes in the connection grid representing the matrix and can be critical since it determines the trade-off between the complexity of the system and the reliability of the system.

The complexity of the redundancy matrix, in terms of number of SPnT switches corresponding to a connection, is directly proportional to the number of connection nodes in the connection grid. By optimising the number of connections in the connection grid representing the redundancy matrix 10, the number of SPnT switches used to manage the failures of equipment items is optimised.

Moreover, the connectivity represented by the connection grid associated with the redundancy matrix 10 determines all of the combinations of failures of equipment items that the redundancy matrix 10 is capable of supporting. An inadequate number of connection nodes or a non-optimal placement of the nodes could greatly degrade the reliability in the payload.

The redundancy matrix can belong to two categories of sliding redundancy matrices:
  perfect matrices, and
  imperfect matrices.

A perfect matrix is configured to support all the combinations of failures and has a well-defined connectivity.

The imperfect matrices are obtained from perfect matrices by adapting two parameters:
  a first parameter corresponding to a complexity modulation parameter defined to modulate the complexity of the matrix (number of connection nodes),
  a second parameter corresponding to a parameter relating to the rate of perfection defined to adapt the rate of perfection of the matrix (percentage of failure cases covered) as required.

To describe a sliding redundancy matrix, different categories of paths which make up the matrix are distinguished:
  the nominal paths,
  the redundant paths, and
  the sliding paths.

A nominal path of the redundancy matrix is used in the absence of failures on the equipment item to connect each channel 3 to its nominal equipment item 20. On the connection grid representing the redundancy matrix, a nominal path comprises the set of connection points ($C_i \leftrightarrow E_i$), forming a first full diagonal D, corresponding to the nominal diagonal (a nominal path comprises each connection between a channel $C_i$ of given index i and the equipment item $E_i$ of the same index).

A redundant path allows each channel 3 to access a single one of the redundant equipment items 20' (there is therefore only a single redundant node per row). A redundant node is a connection node between a channel 3 and a redundant equipment item 20'. On the connection grid representing the redundancy matrix 10, a redundant path comprises the set of connection points ($C_i \leftrightarrow R_j$) between a channel $C_i$ and an equipment item $R_j$. By construction, a redundant path is situated on the right-hand part of the redundancy matrix.

However, the position of the columns of the redundant equipment items 20' (order of the redundant elements) in the connection grid does not affect the connectivity of the underlying matrix (as shown in FIG. 8), that is to say that the order of the rows and of the columns does not affect the connectivity of the matrix.

When failures occur, the redundant paths are prioritised since they do not lead to transient interruptions of the neighbouring channels upon reconfiguration.

A sliding path makes it possible to cover a wider set of combinations of failures. The sliding paths make it possible to operate redundant equipment items 20' situated far from the failed equipment items by virtue of a step-by-step sliding effect. On the connection grid corresponding to the redundancy matrix 10, they form the supplementary neighbouring diagonals $D_l$, which can be more or less full and which are positioned above the nominal diagonal D. On the connection grid representing the redundancy matrix 10, a sliding path comprises the set of connection points ($C_i \leftrightarrow E_j$) between a channel $C_i$ and an equipment item $E_j$, with $E_j$ belonging to a neighbouring diagonal $D_l$.

A full neighbouring diagonal $D_l$ comprises the set of connection points ($C_i \leftrightarrow E_{i+l \bmod n}$).

Figure 12:
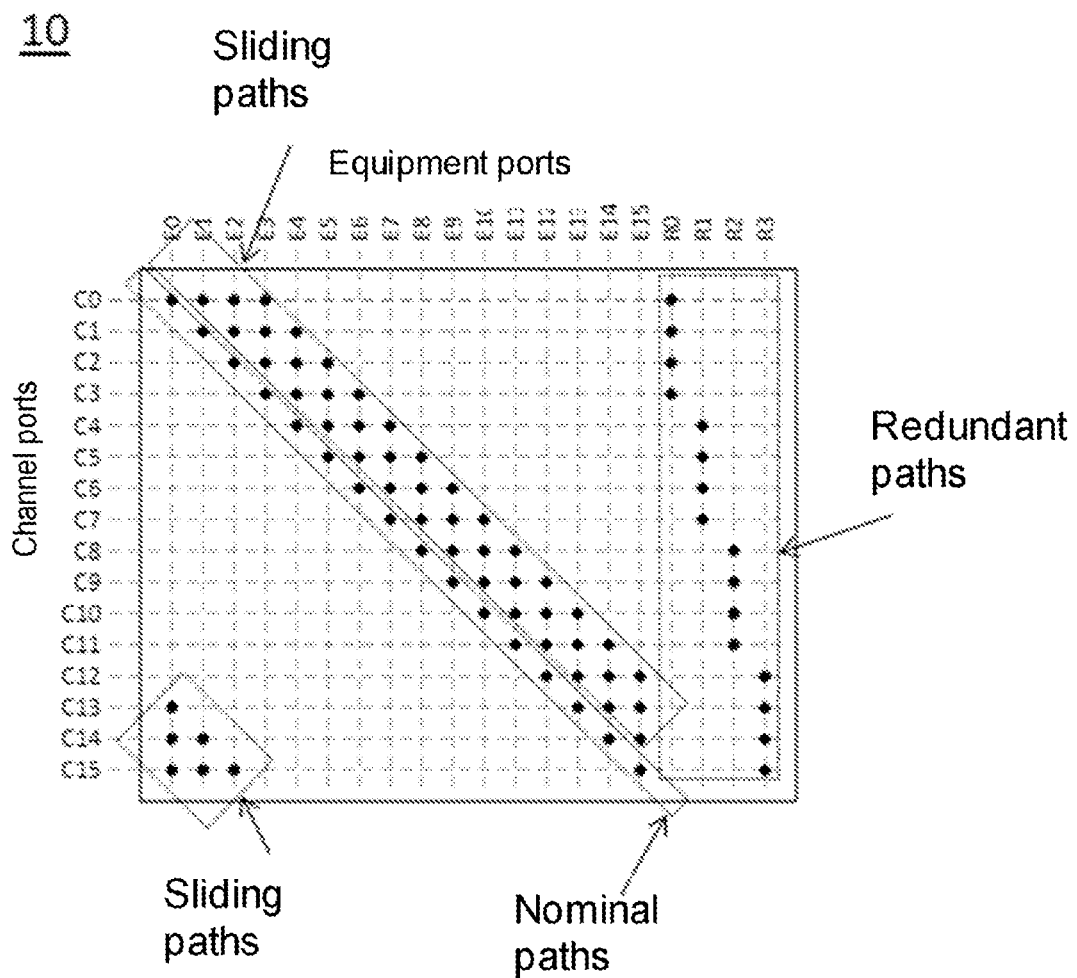
FIG. 12 illustrates the three types of connection node paths in an example of a perfect redundancy matrix of 16×20 dimensions.

FIG. 12 illustrates the 3 types of connection node paths in an example of redundancy matrix 10 of 16×20 dimensions, which is a perfect redundancy matrix.

The redundancy matrix 10 has several degrees of freedom for positioning connection nodes for a given matrix dimension (for a given number of channels 3 and given equipment items 20), such connection nodes being used to reroute the channels 3 to redundant equipment items 20' or to other nominal equipment items 20 (sliding paths), in the case where one or more failures occur on the equipment items 20 of the system 100.

Figure 13:
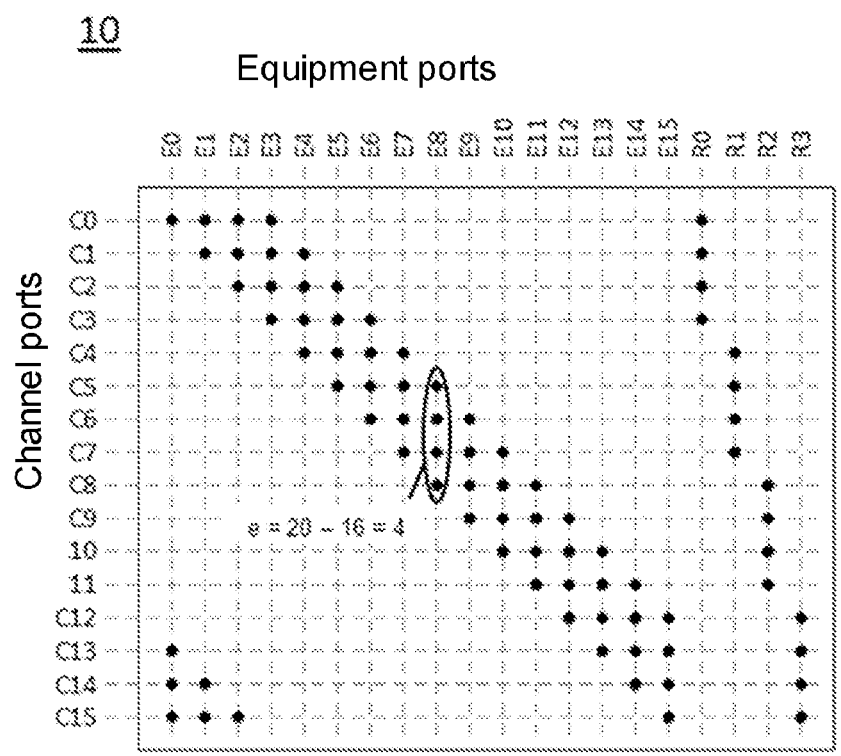
FIG. 13 illustrates the sliding capacity of a redundancy matrix.

The definition of a sliding redundancy matrix 10 is associated with a sliding capacity, denoted e, representing the thickness of the diagonal formed by the nominal paths and the sliding paths, as illustrated by FIG. 13.

The total number of diagonals (nominal and neighbouring) is thus equal to the parameter e. Thus, the number of neighbouring diagonals is equal to L=e−1.

According to the embodiments of the invention, an n×m matrix is perfect if its sliding capacity e must satisfy the condition:

$$e \geq m - n \qquad (2)$$

In particular an n×m matrix of sliding capacity e=m−n is perfect if and only if all its diagonals of sliding paths are full.

For sliding paths to exist in the redundancy matrix 10 and for the matrix to be of sliding matrix type, the capacity e is greater than or equal to 2.

For the matrix to be able to be broken down into elementary blocks that can be chained together, the sliding capacity e is less than or equal to $\lfloor n/(m-n) \rfloor$.

The embodiments of the invention thus provide a redundancy matrix of n×m dimension that has a sliding capacity e that satisfies the condition:

$$2 \le e \le \left\lfloor \frac{n}{m-n} \right\rfloor \quad (3)$$

In the example of FIG. 13, this condition is satisfied, the capacity e being equal to 4 (e=20−16 allows the matrix to be perfect).

The upper bound of the inequation (3) makes it possible to avoid an excessively high number of diagonals which would render slidings beyond the next group possible (to $G_{k+2}$ for example).

The number L designating the number of neighbouring diagonals, without the nominal diagonal (with L=e−1), then confirms:

$$1 \le L \le \left\lfloor \frac{n}{m-n} \right\rfloor - 1 \quad (4)$$

A sliding matrix is also defined by the allocation of the redundant equipment items 20'.

Although it is advantageous, to optimise the subdividing of the matrix into elementary blocks, to equitably and blockwise divide up the channels $C_i$ among the redundant equipment items (for example 4 channels for each redundant equipment item for a matrix of 16×20 dimension), a sliding matrix can nevertheless be perfect despite an irregular distribution of the channels among the redundant equipment items 20' (the number of channels per redundant equipment item can vary from one redundant equipment item to another). Thus, it is sufficient for each redundant equipment item 20' to be able to be connected to at least one channel 3, that is to say for none of the columns associated with the redundant equipment items 20' to be empty (i.e. for each column associated with a redundant equipment item 20' to include at least one connection with a channel 3).

Figure 14:
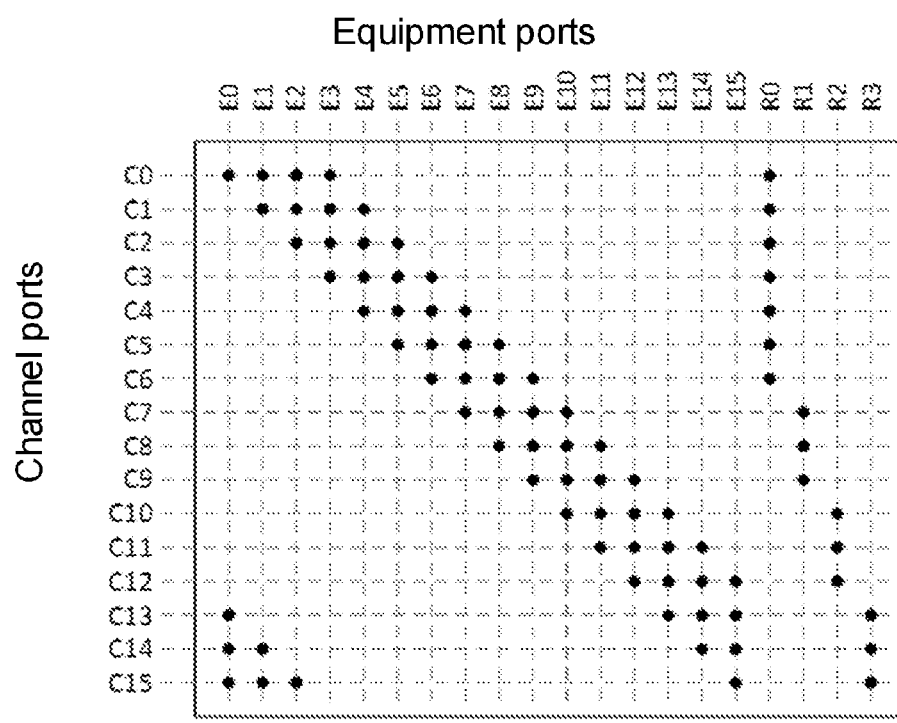
FIG. 14 represents an example of a perfect sliding redundancy matrix, of 16×20 dimension, having an irregular distribution of the channel and redundant equipment item associations.

FIG. 14 represents an example of a perfect sliding redundancy matrix, of 16×20 dimension, despite an irregular distribution of the associations between channels 3 and redundant equipment items 20': $R_0$ is associated with the first 7 channels ($C_0$, $C_1$, . . . , $C_6$), whereas each redundant equipment item $R_1$ to $R_3$ is associated with 3 channels ($R_1$ to $C_7$-$C_9$, $R_2$ to $C_{10}$-$C_{12}$ and $R_3$ to $C_{13}$-$C_{15}$).

Another adjustable feature of the connection grid associated with a sliding redundancy matrix 10 is the degree of filling of the general diagonal delimited by the nominal diagonal D and the neighbouring diagonal of highest rank L. In order to optimise the complexity of the hardware implementation of a redundancy matrix, nodes situated between the diagonal of the nominal paths (nominal diagonal D) and the diagonal of the sliding paths of highest rank (top diagonal $D_L$) can be eliminated or partially depopulated (just a few nodes can be removed from the intermediate diagonals $D_l$ with l between 1 and L−1).

Figure 15:
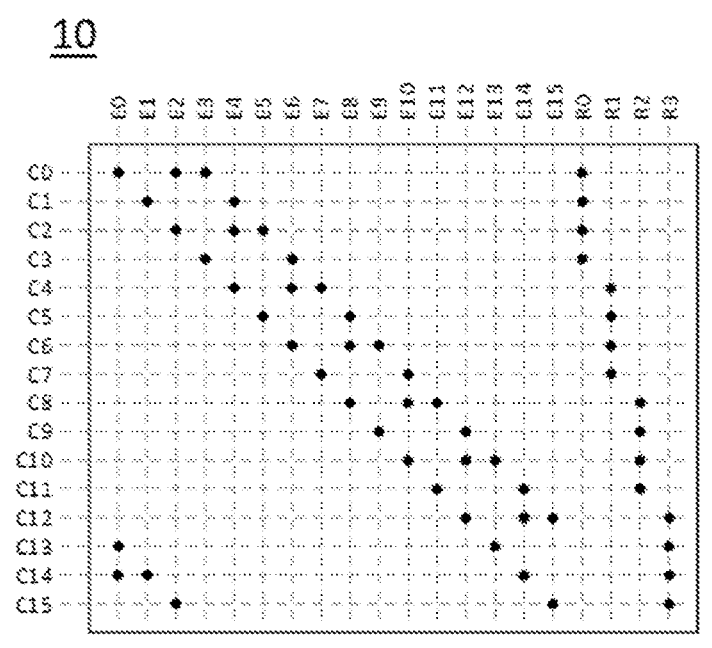
Figure 16:
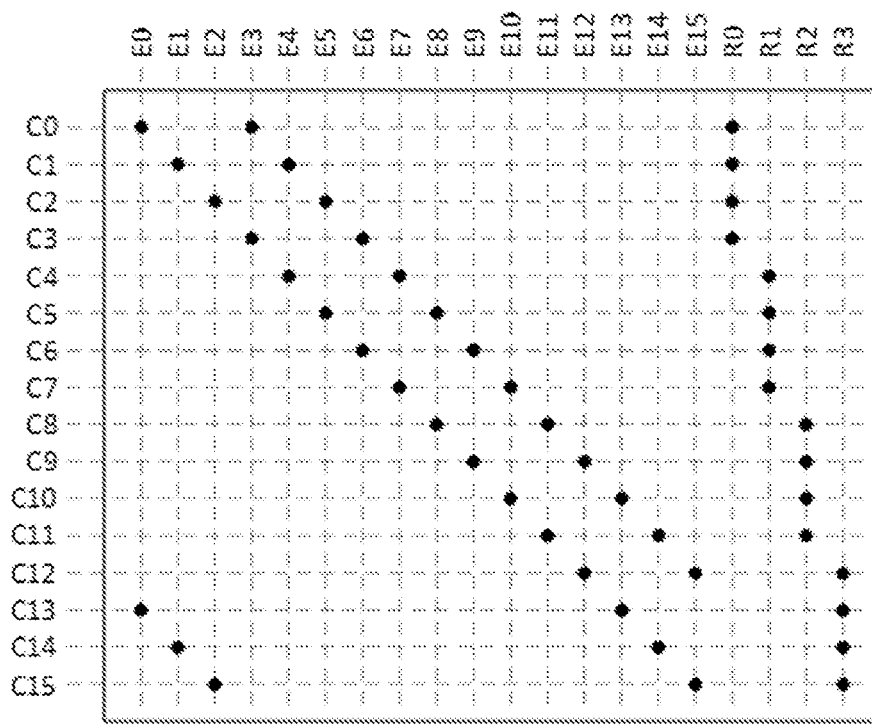
FIG. 16 illustrates an example of a sliding redundancy matrix (hollow matrix), of 16×20 dimension, with minimum filling.

FIG. 15 illustrates an intermediate filling case whereas FIG. 16 illustrates a minimal filling case to highlight the trade-off between the reliability of the redundancy matrix and the complexity of the redundancy matrix (expressed here for an implementation based on SPDT switches).

A case of maximal redundancy matrix filling corresponds to FIG. 13, with a complexity in terms of number of SPDT switches used to produce the hardware implementation of the matrix of 124 (124 SPDT switches) and a rate of perfection on the $4^{th}$ failure of $PL_4$=100%, which corresponds to a perfect matrix.

FIG. 15 corresponds to an intermediate filling of a sliding redundancy matrix (hollow matrix) of 16×20 dimension, with a complexity in terms of number of SPDT switches used to produce the hardware implementation of the matrix of 76 (76 SPDT switches) and a rate of perfection on the $4^{th}$ failure $PL_4$=96.62%.

FIG. 16 thus corresponds to a minimum filling of a sliding redundancy matrix (hollow matrix), of 16×20 dimension, with a complexity in terms of number of SPDT switches used to produce the hardware implementation of the matrix of 60 (60 SPDT switches) and its rate of perfection on the $4^{th}$ failure is $PL_4$=90.67%.

The highest diagonal $D_L$ of the sliding paths (of highest rank) has an important role for the performance of the matrix. In preferred embodiments, the highest diagonal $D_L$ (of highest rank) of the redundancy matrix is advantageously full. Thus, even in a matrix configuration with minimum filling, the connection grid associated with the redundancy matrix can advantageously comprise at least the nominal diagonal $D_L$ of the nominal paths and the diagonal $D_L$ of the high sliding paths.

The embodiments of the invention provide an optimised connection device corresponding to the hardware implementation of one or more sliding redundancy matrices 10 represented by a connection grid, the connection device comprising one or more SPnT switches according to the connection grid.

The redundancy matrix 10 according to the embodiments of the invention is thus advantageously compatible with SPnT switches without in any way presenting the prohibitive defects of the prior art.

In particular, the redundancy matrix structure according to the embodiments of the invention has a structure which can be regular to greatly simplify the balancing of the paths.

The connection grid can be implemented with a tree circuit of SPnT switches, which makes it possible to adjust the length, and therefore the attenuation, of each path individually.

Examples of SPnT switches include, in a nonlimiting manner, STDP, SP3T, SPAT or SPnT switches.

The number of SPDT switches used to implement an N×M connection grid with K nodes is equal to 2K−N−M.

It should be noted that the hardware implementation of the redundancy matrix is not unique. There are in fact several degrees of freedom for the construction of the switch trees.

The redundant equipment items 20' can be distributed among the channels to allow the complete system 100 to be subdivided into elementary blocks, which is particularly advantageous:

in situations in which, for mechanical constraints, for example, the dimension of the printed circuit used for the implementation of the redundancy matrix is too limited to incorporate all of the system, the subdividing then optimising the implementation with a limited number of interconnections between blocks;

for developing generic and reusable blocks covering a wide set of needs when assembled together, which optimises the development costs.

The redundancy matrix is also adaptive. Indeed, the rate of perfection of the matrix can be modulated by adjusting the thickness of the diagonal of the matrix and the degree of filling of the redundancy matrix. The complexity of the hardware implementation of the matrix can thus be optimised to best address the reliability constraints (for example, in the case of an application of the invention to the space industry, the reliability of the payload of the system 100). Such granularity does not exist with the redundancy matrices of the prior art.

The classes of sliding redundancy matrices according to the embodiments of the invention are thus defined by the parameters n/m/e (integers) comprising:

The parameter n which designates the total number of channel ports of a redundancy matrix belonging to the class.

The parameter m which designates the total number of equipment ports of a redundancy matrix belonging to the class.

The parameter e which designates the sliding capacity of a redundancy matrix of the class. Such a quantity represents, on the connection grid of the matrix, the thickness of the diagonal formed by the nominal paths and the sliding paths.

According to the embodiments of the invention, the integers n, m, and e satisfy the following conditions:

$$n > 0, m > n + 1, 2 \le e \le \left\lfloor \frac{n}{m-n} \right\rfloor \quad (5)$$

Thus, to belong to the class of the sliding redundancy matrices, the thickness e of the block of diagonals, including the nominal diagonal, corresponding to the graphic representation of the total number of diagonals, must satisfy the condition (5).

The notation $$\left\lfloor \frac{n}{m-n} \right\rfloor$$

denotes the integer part of $$\frac{n}{m-n}.$$

A sliding redundancy matrix $\{n/m/e\}$ is defined as any redundancy matrix with n channel ports and m equipment ports whose connection grid comprises:

a set of nominal paths, which form the $1^{st}$ diagonal, called "nominal diagonal" D, the nominal paths being defined by:

$\forall i \in [\![ 0; n-1 ]\!]$, $C_i$ connectable to $E_i$ a set of redundant paths, distributed over the m−n redundant equipment items 20' such that each channel $C_i$ can be connected to a single redundant equipment item 20' and each redundant equipment item can be connected to at least one channel and defined by:

$\exists f : [\![ 0; n-1 ]\!] \to [\![ 0; m-n-1 ]\!]$, surjective/

$\forall i \in [\![ 0; n-1 ]\!]$, $C_i$ connectable to $R_{f(i)}$

The connection grid can further comprise a set of sliding paths, which form at least one full "high diagonal" $D_L$ and, optionally, partially filled "intermediate diagonals" $D_l$ defined by:

$\forall i \in [\![ 0; n-1 ]\!]$, $C_i$ connectable to $E_{i+(e-1) \text{modulo } n}$ If $e > 2, \exists S \subset [\![ 0; n-1 ]\!] \times [\![ 1; e-2 ]\!], / \forall (i,k) \in S, C_i$ connectable to $E_{i+k \text{ modulo } n}$ In one embodiment, the function $f$ can be surjective and increasing.

In one embodiment, the redundancy matrix 10 can be configured so as to achieve the optimum in terms of population of the matrix so as to obtain a target reliability for a subset of the system 100 composed of nominal equipment items 20 bracketed by an input redundancy matrix 10-A and an output redundancy matrix 10-B, and associated redundant equipment items 20'.

Figure 17:
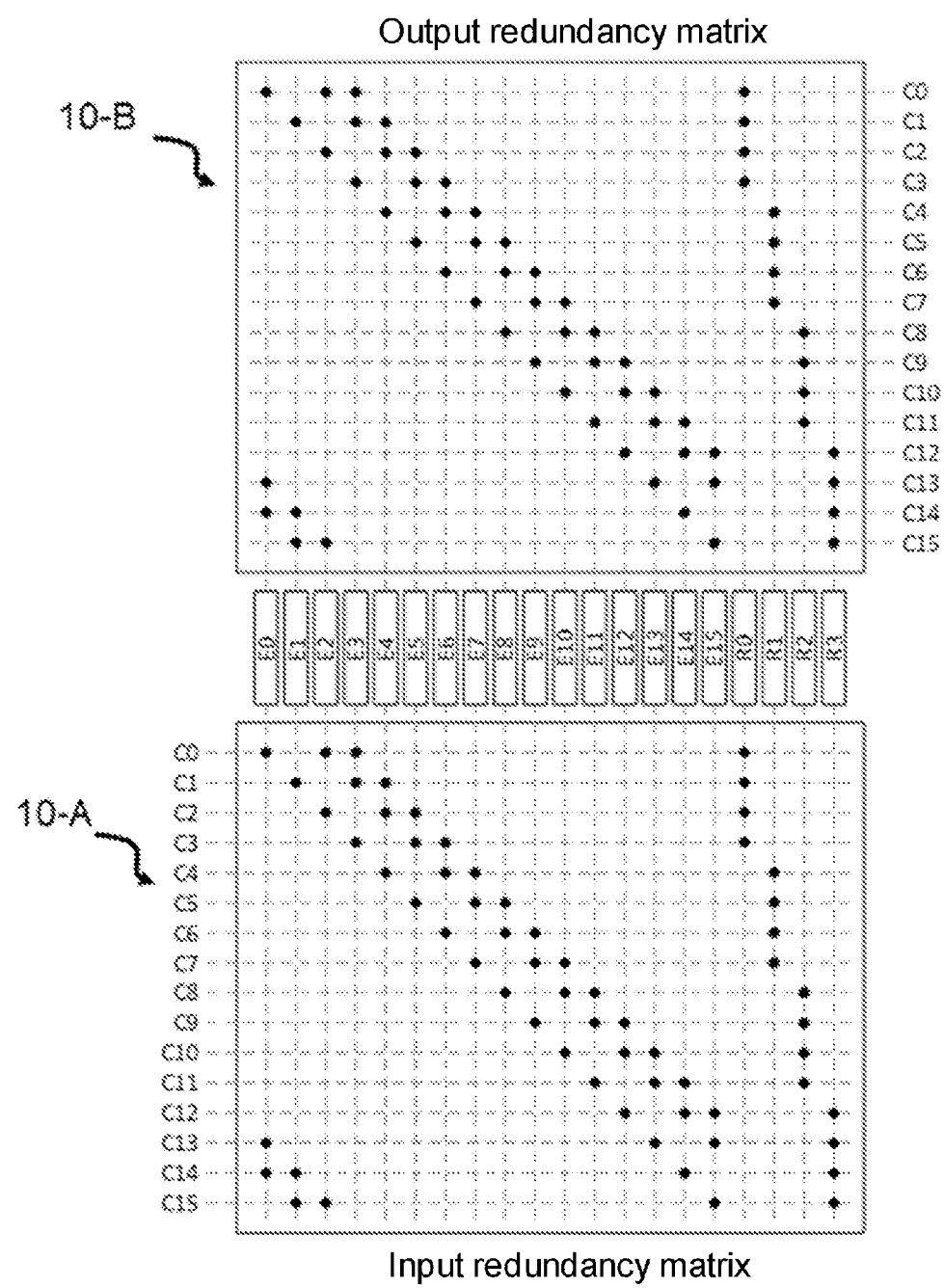
FIG. 17 represents a subset of the system comprising an input redundancy matrix 10-A and an output redundancy matrix 10-B.

FIG. 17 represents such a subset of the system 100 comprising nominal equipment items 20 ($E_0$-$E_{15}$) and redundant equipment items 20' ($R_0$-$R_3$) (subsystem) and an input redundancy matrix 10-A and an output redundancy matrix 10-B.

The inventors established that there is no universal optimal level of depopulation of a redundancy matrix in as much as the reliability of the subsystem is not dependent only on the rates of perfection of the matrix but also on the reliability of the equipment items (both nominal and redundant) connected to the redundancy matrix.

Determining the optimum under-population of a redundancy matrix 10 involves partially or entirely eliminating intermediate diagonals of a redundancy matrix by retaining the nominal diagonal D ("diagonal of the nominals") and the diagonal of highest rank $D_L$ ("top diagonal"). The "partial" elimination of an intermediate diagonal corresponds to the elimination of only certain nodes from the intermediate diagonal.

At least a part or all of the intermediate diagonals $D_l$ (of rank l<L) can be eliminated from the redundancy matrix 10.

Based on the connection grid of each redundancy matrix 10 (which thus comprises at least the nominal diagonal D and the top diagonal $D_L$, possibly complemented by one or more intermediate diagonals $D_l$), the hardware implementation of the corresponding redundancy matrix 10 can be produced from the connection grid in the form of a circuit (as used here, the hardware "implementation" of the redundancy matrix 10 thus refers to the circuit corresponding to the connection grid).

In one embodiment, the circuit used to implement the redundancy matrix 10 can be based on SPnT switch trees.

It should be noted that this implementation based on switch trees is not specific to the sliding redundancy matrices and can be applied more generally to a redundancy matrix associated with any type of connection grid.

The SPnT switch trees of the circuit implementing a redundancy matrix 10 can be generated by taking each port of the redundancy matrix 10 as the root of one of the trees (a "port of the redundancy matrix" corresponds to a channel port (row) of the matrix or an equipment port of the matrix (column)). Thus, the circuit implementing the redundancy matrix 10 can comprise a tree for each row and for each column of the connection grid. An SPnT switch tree can thus be constructed at each channel or equipment port of the matrix, each channel/equipment port being connected to the root of the tree which is associated with it.

A tree of the circuit, implementing the redundancy matrix 10, connected to a channel port can have as many branches as there are connection nodes on the corresponding row in the connection grid.

A tree of the circuit 10 whose root is connected to an equipment port can have as many branches as there are connection nodes on the corresponding column in the grid.

The form of a tree can vary. The circuit 10 can for example use balanced trees or unbalanced trees.

Each node in the connection grid on the row $L_i$ and the column $T_j$ corresponds to a branch on a tree of switches of root connected to C; and to a branch on a tree of switches of root connected to $E_j$ or $R_j$.

These two branches are linked to one another to allow the $C_j \leftrightarrow E_j$ or $R_j$ connection.

Adding a node in the connection grid on a row $L_i$ and a column $T_j$ means adding a branch on the tree of switches of root $C_i$ and on the tree of switches of root $E_j$ (or $R_j$).

Figure 18:
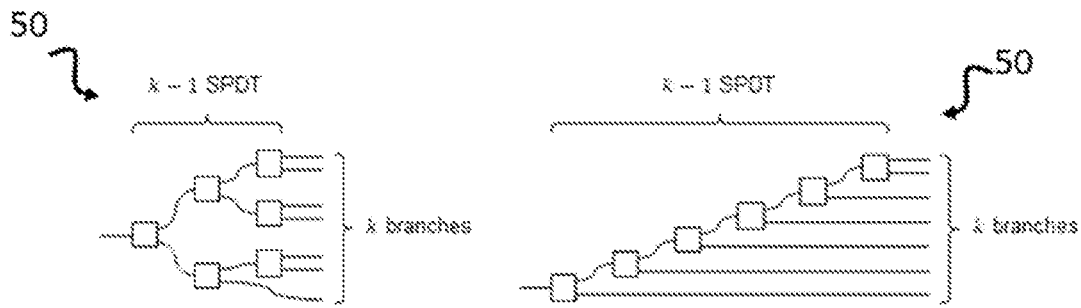
FIG. 18 represents examples of SPDT switch trees with k branches that can be used in an implementation of the sliding redundancy matrix, according to embodiments of the invention.

Examples of trees of switches are represented in FIG. 18, in the case of switches of SPDT type.

FIG. 18 represents examples of trees 50 of SPDT switches with k ((k−1) SPDT) branches that can be used in an implementation of the sliding redundancy matrix 10.

To form the circuit 10, the paths described by the connection grid are then implemented by connecting the trees of the channel ports to the trees of the equipment ports, branch to branch. The form of the branches of the trees to be connected together can vary.

Figure 19:
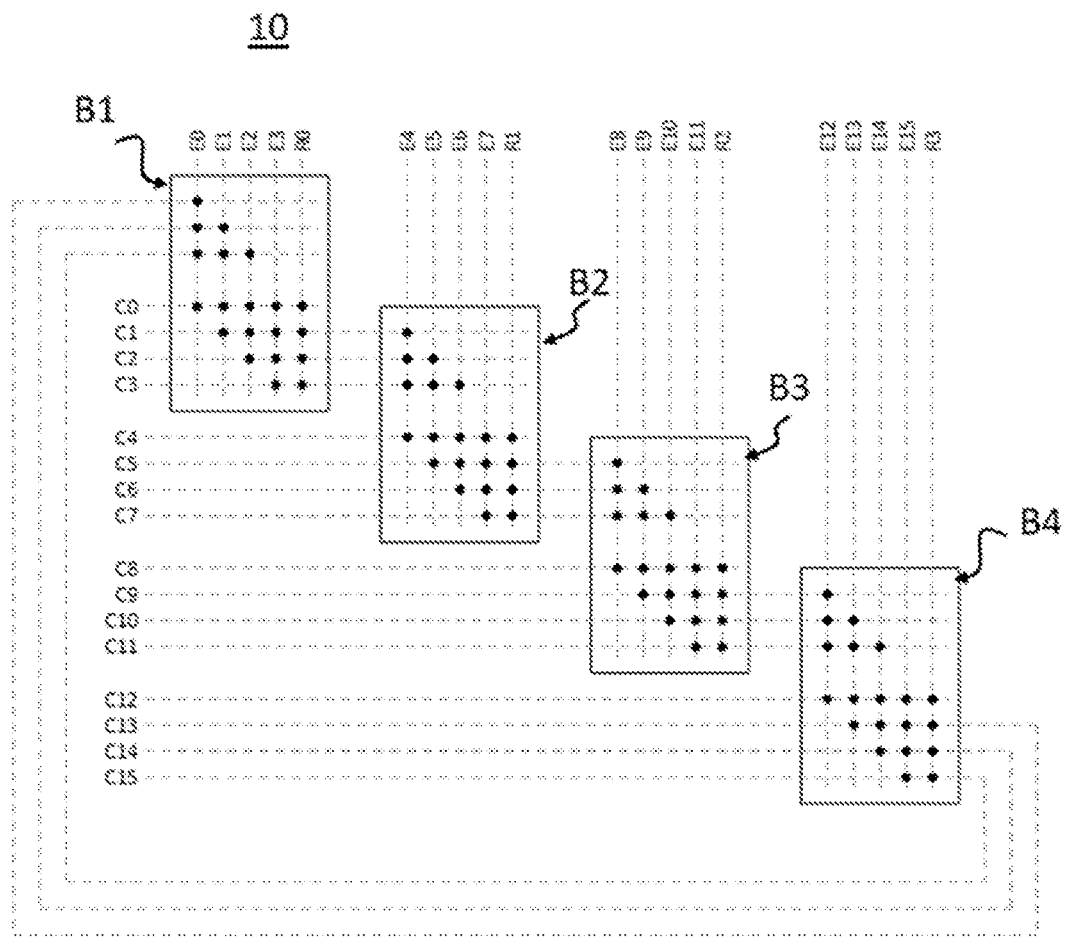
FIG. 19 represents an example of implementation of the perfect 16×20 sliding redundancy matrix.

FIG. 19 represents a perfect 16×20 sliding redundancy matrix 10. The complex matrix represented in FIG. 19 can be subdivided into 4 identical elementary blocks B1, B2, B3 and B4.

FIG. 19 highlights the interconnections between elementary blocks and shows that it is advantageous to attach a redundant equipment item to the block of its group to avoid having to create new interconnections between blocks.

Figure 20:
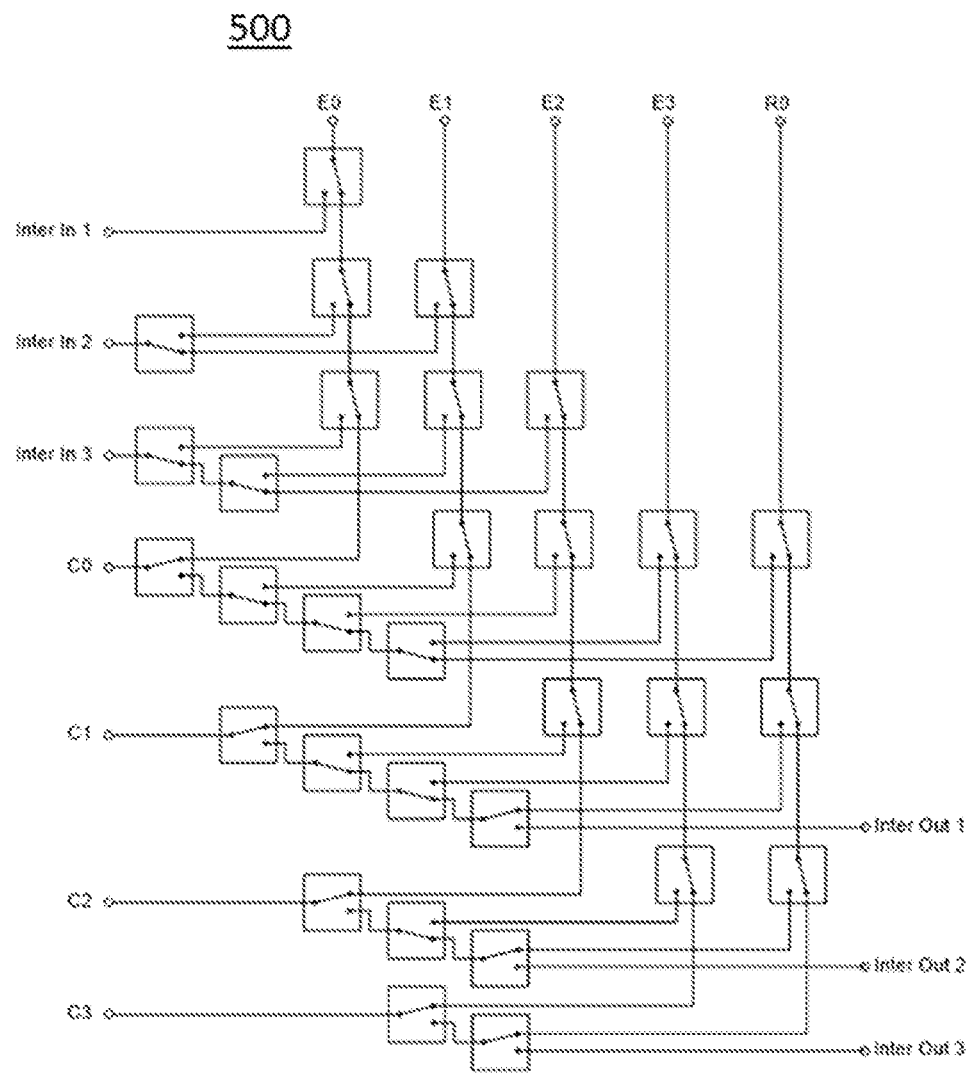
FIG. 20 represents an example of implementation of the perfect 16×20 sliding redundancy matrix represented in FIG. 20, in the form of a circuit comprising SPDT switch trees.

FIG. 20 represents an example of implementation of the perfect 16×20 sliding redundancy matrix 10 represented in FIG. 19, in the form of a circuit comprising trees of SPDT switches.

The circuit 500 of FIG. 20 corresponds only to the block B1 and therefore only to a part of the final circuit implementing the redundancy matrix 10. The implementation of the other blocks of FIG. 19 is similar, by adapting the channel and equipment ports. As shown in FIG. 20, the circuit 500 comprises a tree connected to each channel port $C_i$ with as many branches as there are nodes on the corresponding row in the connection grid and a tree connected to an equipment port $E_j$ or $R_j$, also with as many branches as there are connection nodes on the corresponding column in the grid.

It should be noted that a submatrix of a redundancy matrix does not have only channel and equipment ports but can also have incoming interconnection ports $II_i$ (in rows) and outgoing interconnection ports $IO_i$ (in columns).

Some trees of switches can straddle two submatrices (between 2 PCBs for example), that is to say that the root and a part of the tree will be on the first board and the rest will be on the other, as can be seen in FIG. 20. The incoming interconnection ports $II_i$ ("Inter In") are not the roots of the trees (they are situated on the submatrix B4). Similarly, the last trees do not stop at the outgoing interconnection ports ("Inter Out") but continue on the submatrix B2. This subdivision in the middle of the trees makes it possible to minimise the number of interconnections between the submatrices.

The controls of the switches can depend on the implementation and on the nature of the switches used.

In an exemplary embodiment, when a failure state is detected, a set of nodes can be identified in the connection grid which allows a new valid routing, that is to say one which will associate with each channel an operational equipment item (an equipment item that has not failed).

Different algorithms can be used to make it possible to identify a valid routing, if one exists, for a given failure state (for example algorithms based on graph theory, on maximum coupling and/or on bipartite graphs).

Once the nodes to be used are identified, the switches are controlled, based on the specific technology of the switch, on its topology and on its position in the circuit.

In the embodiments based on trees of SPDT switches, a path can then be established between the root of each tree and the branch corresponding to the node to be used in the connection grid.

Advantageously, the embodiments of the invention make it possible to obtain a hardware redundancy matrix implementation that has an optimised connectivity, that is to say an optimisation of all of the channel-equipment item connections that they can establish.

In a particular example of application, the embodiments of the invention can be used to replace redundancy rings of the prior art, which are heavy, bulky and costly, with redundancy matrices according to the embodiments of the invention which can be based for example on miniaturised electromechanical SPDT switches, in the space industry field.

The invention can be applied more generally to any industrial application using systems or subsystems that use switching matrices that are combinatorial, that is to say that produce the combinations of N inputs to M outputs, such as, for example, the redundancy matrices, the switching matrices in test systems, the selectivity matrices, etc.

Moreover, the invention is not limited to the embodiments described hereinabove by way of nonlimiting example. It encompasses all the variant embodiments which will be able to be envisaged by the person skilled in the art. In particular, the person skilled in the art will understand that the invention applies to any type of application using redundancy matrices to reroute the signals from one equipment item to a redundant or nominal equipment item.

Moreover, although the invention has been described with reference to switches of SPnT type, the person skilled in the art will understand that the invention is not limited to such types of switches. For example, the hardware implementation of the redundancy matrix can use a so-called "crossbar" implementation and switches of C-switch type or R/T switches, the redundancy matrix 10 then being replaced by a total selectivity matrix which allows the connection of any input to any output, with a full connection grid. For our sliding redundancy matrix, the crossbar network would be greatly depopulated to reveal only the nodes described by the connection grid.

The invention claimed is:

1. A system comprising a set of equipment items, said equipment items comprising one or more nominal equipment items and one or more redundant equipment items, a redundant equipment item being associated with one or more nominal equipment items, the system comprising n channels linked to said equipment items, the channels linked to the equipment items being input or output channels of the equipment items, the system comprising at least one redundancy matrix of n×m dimension configured to route the signals of a channel from a given equipment item to a redundant equipment item associated with said given equipment item or to another nominal equipment item, in response to the detection of a rerouting-triggering event relating to an equipment item, n and m each being a positive integer greater than or equal to one;

wherein each redundancy matrix is represented by a connection grid having a matrix representation comprising rows and columns, each row corresponding to a channel $C_{i, 0 \leq i < n}$ of the system and each column corresponding to an equipment item of the system, and in that the connection grid comprises a set of connection points corresponding to a point of intersection between a channel and an equipment item, said points of connection of the connection grid comprising at least:

all of the points of intersection of a nominal path comprising the points of intersection of the connection grid situated on a nominal diagonal of the connection grid, between each row corresponding to a channel of given index i and a column corresponding to a nominal equipment item of the same index i, and all of the points of intersection of a redundant path comprising the points of intersection of the connection grid situated at the intersection between each row corresponding to a channel $C_i$ of given index i and a column corresponding to a redundant element of index $f(i)$ such that the function $f$ is a defined surjective function of the set $[\![0;n-1]\!]$ on $[\![0;m-n-1]\!]$ for any index i, the redundancy matrix being implemented in the form of a circuit comprising a plurality of switches arranged according to the connection grid.

2. The system according to claim 1, wherein each redundancy matrix is a sliding redundancy matrix and said connection points of the connection grid further comprise:

all of the points of intersection of a sliding path comprising the points of intersection of the connection grid situated on an upper diagonal of the connection grid, between each row corresponding to a channel $C_i$ of given index i and a nominal equipment item of index i+(e−1) modulo n, with e designating a sliding capacity of the matrix and e being a positive integer greater than two, the sliding capacity being the number of points of the matrix situated between a given point of the nominal diagonal on a given row of the connection grid and a point of the upper diagonal situated on the same column of the connection grid.

3. The system according to claim 2, wherein if n is strictly greater than zero and m is strictly greater than n+1, the sliding capacity e satisfies the following condition:

$$2 \leq e \leq \left\lfloor \frac{n}{m-n} \right\rfloor.$$

4. The system according to claim 3, wherein a perfect redundancy matrix has a sliding capacity e satisfying the condition:

$e \geq m-n.$

5. The system according to claim 4, wherein a redundancy matrix of sliding capacity e=m−n is perfect if, and only if, all the points of the intermediate diagonals of the sliding path are connection points.

6. The system according to claim 4, wherein a perfect redundancy matrix has a perfection rate equal to 1, the perfection rate representing the number of rerouting-triggering events covered by the redundancy matrix.

7. The system according to claim 1, wherein each redundancy matrix is a sliding redundancy matrix and the sliding path further comprises the points of intersection of the connection grid situated on one or more intermediate diagonals of the connection grid, between each row corresponding to a channel $C_i$ of index i and a nominal equipment item of index $E_{i+k \bmod{n}}$, with (i,k) belonging to S and $S \subset [\![0;n-1]\!] \times [\![1;e-2]\!]$, e being a positive integer greater than two.

8. The system according to claim 7, wherein if n is strictly greater than zero and m is strictly greater than n+1, the sliding capacity e satisfies the following condition:

$2 \leq e \leq \lfloor n(m-n) \rfloor.$

9. The system according to claim 8, wherein a perfect redundancy matrix has a sliding capacity e satisfying the condition:

$e \geq m-n.$

10. The system according to claim 8, wherein a redundancy matrix of sliding capacity e=m−n is perfect if, and only if, all the points of the intermediate diagonals of the sliding path are connection points.

11. The system according to claim 8, wherein a perfect redundancy matrix has a perfection rate equal to 1, the perfection rate representing the number of rerouting-triggering events covered by the redundancy matrix.

12. The system according to claim 1, comprising an input redundancy matrix associated with the input channels of the equipment items and an output redundancy matrix associated with the output channels of the equipment items.

13. The system according to claim 1, wherein the switches are of SPnT type.

14. The system according to claim 13, wherein the circuit implementing the redundancy matrix is based on SPnT switch trees.

15. The system according to claim 14, wherein the circuit implementing the redundancy matrix comprises a tree corresponding to each row and a tree corresponding to each column of the connection grid, the root of each SPnT switch tree of the circuit corresponding to a row of the connection grid associated with a channel or to a column of the connection grid associated with an equipment item.

16. The system according to claim 15, wherein a tree of said circuit implementing the redundancy matrix connected to a row corresponding to a channel has as many branches as the connection points on said row in the connection grid and a tree of said circuit implementing the redundancy matrix connected to a column corresponding to an equipment item has as many branches as there are connection points on said column in the connection grid.

17. The system according to claim 15, wherein the trees corresponding to the rows of the connection grid are connected to the trees corresponding to the columns of the connection grid.

18. The system according to claim 1, configured to manage a number of failures on said equipment items, said rerouting condition being the occurrence of a failure on an equipment item.

19. The system according to claim 1, wherein the number of equipment item failures managed by the system is an increasing function of the sliding capacity of the matrix, when the intermediate diagonals are all full.

* * * * *